United States Patent [19]
Kawada et al.

[11] Patent Number: 5,388,122
[45] Date of Patent: Feb. 7, 1995

[54] MODULATION AND DEMODULATION SYSTEM

[75] Inventors: Noboru Kawada; Yuri Nigaki, both of Kawasaki, Japan

[73] Assignee: Fujitsu Limited, Kawasaki, Japan

[21] Appl. No.: 109,043

[22] Filed: Aug. 19, 1993

[30] Foreign Application Priority Data

Feb. 18, 1993 [JP] Japan .................. 5-029368

[51] Int. Cl.⁶ ............................................ H04B 1/38
[52] U.S. Cl. ........................................ 375/8; 375/106; 375/118
[58] Field of Search ................................ 375/7–8, 375/38, 10, 40, 97, 100, 106, 113, 118–121; 329/304, 345; 379/93

[56] References Cited

U.S. PATENT DOCUMENTS

| | | | |
|---|---|---|---|
| 4,788,696 | 11/1988 | Sakame et al. | 375/118 |
| 4,847,880 | 7/1989 | Kamerman et al. | 375/8 |
| 4,849,997 | 7/1989 | Suzuki et al. | 375/118 |
| 4,860,308 | 8/1989 | Kamerman et al. | 375/8 |
| 4,868,850 | 9/1989 | Kaku et al. | 375/8 |

Primary Examiner—Stephen Chin
Assistant Examiner—Young Tse
Attorney, Agent, or Firm—Staas & Halsey

[57] ABSTRACT

A modulation and demodulation system which modulates and demodulates a signal in a main channel for main data and a secondary channel for secondary data obtained by frequency division and uses, upon demodulation, a frequency timing extracted from the secondary channel as a sampling timing for an analog to digital conversion device for the main channel. The modulation and demodulation system is improved in that it can rapidly restore, when a timing error occurs, a processing condition in which a normal timing is used, and comprises a demodulation device which includes a phase timing error detection device for detecting an error of phase timing information extracted from the main channel and a storage device for storing the phase timing information. When the phase timing error detection device detects the error of the phase timing information, the demodulation device performs demodulation processing of main data using the phase timing information stored in the storage device.

23 Claims, 15 Drawing Sheets

MODULATION AND DEMODULATION SYSTEM

BACKGROUND OF THE INVENTION

1. Field of the Invention

This invention relates to a modulation and demodulation system which modulates and demodulates a signal in a main channel for main data and a secondary channel for secondary data obtained by frequency division, and more particularly to a modulation and demodulation system of the type mentioned which uses, when it performs demodulation processing of main data, a frequency timing extracted from the secondary channel as a sampling timing for analog to digital conversion means for the main channel.

2. Description of the Related Art

Modems (modulator-demodulators) are generally used widely for transmission of data in analog circuits which make use of a voice band.

Some modems make use, in addition to a main channel for transmitting main data of a terminal or a like element, of a secondary channel provided by frequency division for transmitting signal quality information, a receive level and some other information to supervise the state of the network.

FIG. 15 shows a general construction of an on-line system. Referring to FIG. 15, in the on-line system shown, a plurality of modems 203 are connected to a host computer 201 by way of a communication control apparatus (CCP) 202, and each of the modems 203 is connected by way of transmission lines 204 to other modems 203' installed at another location. A terminal 205 is connected to each of the models 203'.

The on-line system further includes a network supervisory apparatus 206, for which a secondary channel is used.

By the way, a state signal of a modem can be transmitted, from each of the host side modems 203 shown in FIG. 15, as it is to the network supervisory apparatus 206, but from each of the terminal side modems 203', a state signal thereof is transmitted to the associated host side modem 203 so that it is transmitted by way of the modem 203 to the network supervisory apparatus 206.

Since a state signal of a modem must necessarily be transmitted without having any influence on main data, each of the modems 203 and 203' divides, for example, a voice band of 0.3 kHz to 3.4 kHz by frequency division to provide a secondary channel for secondary data in addition to a main channel for main data as seen in FIG. 16.

It is to be noted that phase shift keying (PSK), orthogonal amplitude modulation (QAM) or some other modulation is used for a main signal while frequency shift keying (FSK) is used for a secondary signal.

By the way, it is required for modems in recent years to establish multiple point connection in addition to a rise of the communication rate to reduce the cost of the circuit. To this end, it is an effective technique to divide a frequency band of a main channel into a plurality of bands to transmit a plurality Of data by way of the same circuit. An apparatus which is used for modulation and demodulation of a signal communicated in a main channel having a plurality of frequency bands obtained by frequency division is called multiple frequency modem.

When the main channel involves a single frequency band, the roll-off ratio is sufficiently high to extract a timing for use for demodulation processing of main data readily from the main channel. However, when the main channel is divided into a plurality of frequency bands as described above, the roll-off ratio of the main channel is decreased so low that it is difficult to extract a timing component from the main channel.

Therefore, it is necessary to extract a timing component from the secondary channel whose roll-off ratio is sufficiently high. Thus, a multiple frequency modem uses, when it performs demodulation processing of main data, a frequency timing extracted from the secondary channel as a sampling timing for a digital value (output of an analog to digital converter) of the main data.

When the frequency band of the main channel is not divided, a frequency timing extracted from the main channel can be used as it is as a sampling timing for a digital value as described above, and accordingly, the timings coincide with each other without fail and no timing error occurs.

With a multiple frequency modem described above, however, since a digital value (output of an analog to digital converter) is sampled with a frequency timing extracted from the secondary channel whereas a phase timing extracted from the main channel is used for demodulation processing of main data, a timing error (an out-of-synchronization condition) sometimes occurs only in demodulation processing of main data. Accordingly. it is desired that, when such a timing error actually occurs, the modem itself restores demodulation processing of the main channel based on a normal timing.

SUMMARY OF THE INVENTION

It is an object of the present invention to provide a modulation and demodulation system which itself can rapidly restore, when a timing error occurs in demodulation processing of main data, a normal operation condition based on a normal timing.

In order to attain the object described above, according to an aspect of the present invention, there is provided a modulation and demodulation system wherein a signal is communicated in a main channel for main data and a secondary channel for secondary data obtained by frequency division, which comprises modulation means for modulating and transmitting main data and secondary data, demodulation means for receiving and demodulating a receive signal to reproduce such main data and secondary data, and analog to digital conversion means for converting the receive signal from an analog signal into a digital signal and sampling the main data of the main channel outputted to the demodulation means using as a sampling timing a frequency timing extracted from the secondary channel, the demodulation means including phase timing error detection means for detecting an error of phase timing information extracted from the main channel, and storage means for storing the phase timing information extracted from the main channel to temporarily save the phase timing information, the demodulation means performing, when the phase timing error detection means detects an error of the phase timing information, demodulation processing of the main data using the phase timing information stored in the storage means.

Preferably, the demodulation means further includes carrier detection means for detecting a carrier, and when the carrier detection means detects a carrier, the phase timing error detection means performs an error detection operation, but when the result of detection of the carrier detection means changes from presence of a carrier to absence of a carrier, last phase timing information extracted from the main channel is stored into the storage means.

According to another aspect of the present invention, there is provided a modulation and demodulation system wherein a signal is communicated in a main channel for main data and a secondary channel for secondary data obtained by frequency division, which comprises modulation means for modulating and transmitting main data and secondary data, demodulation means for receiving and demodulating a receive signal to reproduce such main data and secondary data, and analog to digital conversion means for converting the receive signal from an analog signal into a digital signal and sampling the main data of the main channel outputted to the demodulation means using as a sampling timing a frequency timing extracted from the secondary channel, the demodulation means including phase timing error detection means for detecting an error of phase timing information extracted from the main channel, the demodulation means performing re-leading-in processing of timing information when the phase timing error detection means detects an error of the phase timing information.

Preferably, the demodulation means includes storage means for storing phase timing information extracted from the main channel to temporarily save the phase timing information, and carrier detection means for detecting a carrier, and when the carrier means detects a carrier, the phase timing error detection means performs an error detection operation, but when the result of detection of the carrier detection means changes from presence of a carrier to absence of a carrier, last phase timing information extracted from the main channel is stored into the storage means.

According to a further aspect of the present invention, there is provided a modulation and demodulation system wherein a signal is communicated in a main channel for main data and a secondary channel for secondary data obtained by frequency division, which comprises modulation means for modulating and transmitting main data and secondary data, demodulation means for receiving and demodulating a receive signal to reproduce such main data and secondary data, and analog to digital conversion means for converting the receive signal from an analog signal into a digital signal and sampling the main data of the main channel outputted to the demodulation means using as a sampling timing a frequency timing extracted from the secondary channel, the demodulation means including phase timing error detection means for detecting an error of phase timing information extracted from the main channel, storage means for storing the phase timing information extracted from the main channel to temporarily save the phase timing information, arid timing error detection means for detecting an error of timing information extracted from the secondary channel, the demodulation means performing, when the phase timing error detection means detects an error and the timing error detection means does not detect an error, demodulation processing of the main data using the phase timing information stored in the storage means whereas the demodulation means performs re-leading-in processing of timing information when the phase timing error detection means detects an error and also the timing error detection means detects an error.

Preferably, the demodulation means further includes carrier detection means for detecting a carrier, and when the carrier detection means detects a carrier, the phase timing error detection means performs an error detection operation, but when the result of detection of the carrier detection means changes from presence of a carrier to absence of a carrier, last phase timing information extracted from the main channel is stored into the storage means.

In this instance, when the carrier detection means detects a carrier again after the last phase timing information has been stored into the storage means, the demodulation means may perform demodulation processing of the main data using the last phase timing information stored in the storage means.

Preferably, the demodulation means further includes circuit disconnection time measurement means for measuring a circuit disconnection time after the result of detection of the carrier detection means changes from presence of a carrier to absence of a carrier until the result of detection changes back to presence of a carrier, and circuit disconnection time determination means for comparing a time measured by the circuit disconnection time measurement means with a preset time, and when the circuit disconnection time determination means determines that the measured time by the circuit disconnection time measurement means is longer than the preset time, the demodulation means performs re-leading-in of timing information.

Preferably, the demodulation means further includes a timer for counting an elapsed time after the demodulation means starts demodulation processing of the main data, and the phase timing error detection means performs an error detection operation after the timer counts a predetermined time.

Preferably, the demodulation means further includes convergence/divergence detection means for referring to signal points of the receive signal having a particular eye pattern, which has been generated upon modulation and transmission, to detect and determine convergence/divergence of the eye pattern, and when the demodulation means is to perform demodulation processing of the main data using the phase timing information stored in the storage means, the convergence/divergence detection means detects and determines convergence/divergence of the eye pattern, and then when the convergence/divergence detection means determines that the eye pattern converges, the demodulation means continues demodulation processing of the main data using the phase timing information, but when the convergence/divergence detection means determines that the eye pattern diverges, the demodulation means performs re-leading-in of timing information.

With the modulation and demodulation system of the present invention, the following effects or advantages can be achieved.

1. When a timing error is detected upon demodulation processing of main data, timing information which has been stored last into the storage means is read out to continue the demodulation processing of main data, and consequently, the modulation and demodulation system itself can rapidly restore its demodulation processing condition in which normal timing information is used.

2. A timing error detection operation can be performed avoiding an unstable condition at an instant immediately after transition to a data sequence, and it can be prevented with certainty that, while the timing is normal, a timing error is detected in error, resulting in a disabled condition of communication.

3. When a timing error is detected, timing information re-leading-in processing is entered immediately, and consequently, occurrence of a periodic error which arises from an unstable condition of timing information from the secondary channel can be prevented with certainty, and the modulation and demodulation system itself can restore a demodulation processing condition in which normal timing information is used. Consequently, a normal communication condition can be maintained.

4. Since presence or absence of a variation error of timing information of secondary data is detected and re-leading-in processing of timing information is entered only when presence of a variation error is detected, when there is no variation error, demodulation processing is performed using timing information stored in the storage means without performing re-leading-in of timing information. Consequently, the modulation and demodulation system itself can restore a demodulation processing condition in which normal timing information is used without taking wasteful time for timing re-leading-in processing.

5. When the circuit disconnection time is long, re-leading-in processing of timing information is entered immediately, and consequently, wasteful processing time can be omitted and the modulation and demodulation system itself can further rapidly restore a demodulation processing condition in which normal timing information is used.

Further objects, features and advantages of the present invention will become apparent from the following detailed description when read in conjunction with the accompanying drawings in which like parts or elements are denoted by like reference characters.

DETAILED DESCRIPTION OF THE PREFERRED EMBODIMENTS a. Principle of the Present Invention Prior to description of a preferred embodiment of the present invention, the principle of the present invention will be described first.

Figure 1:
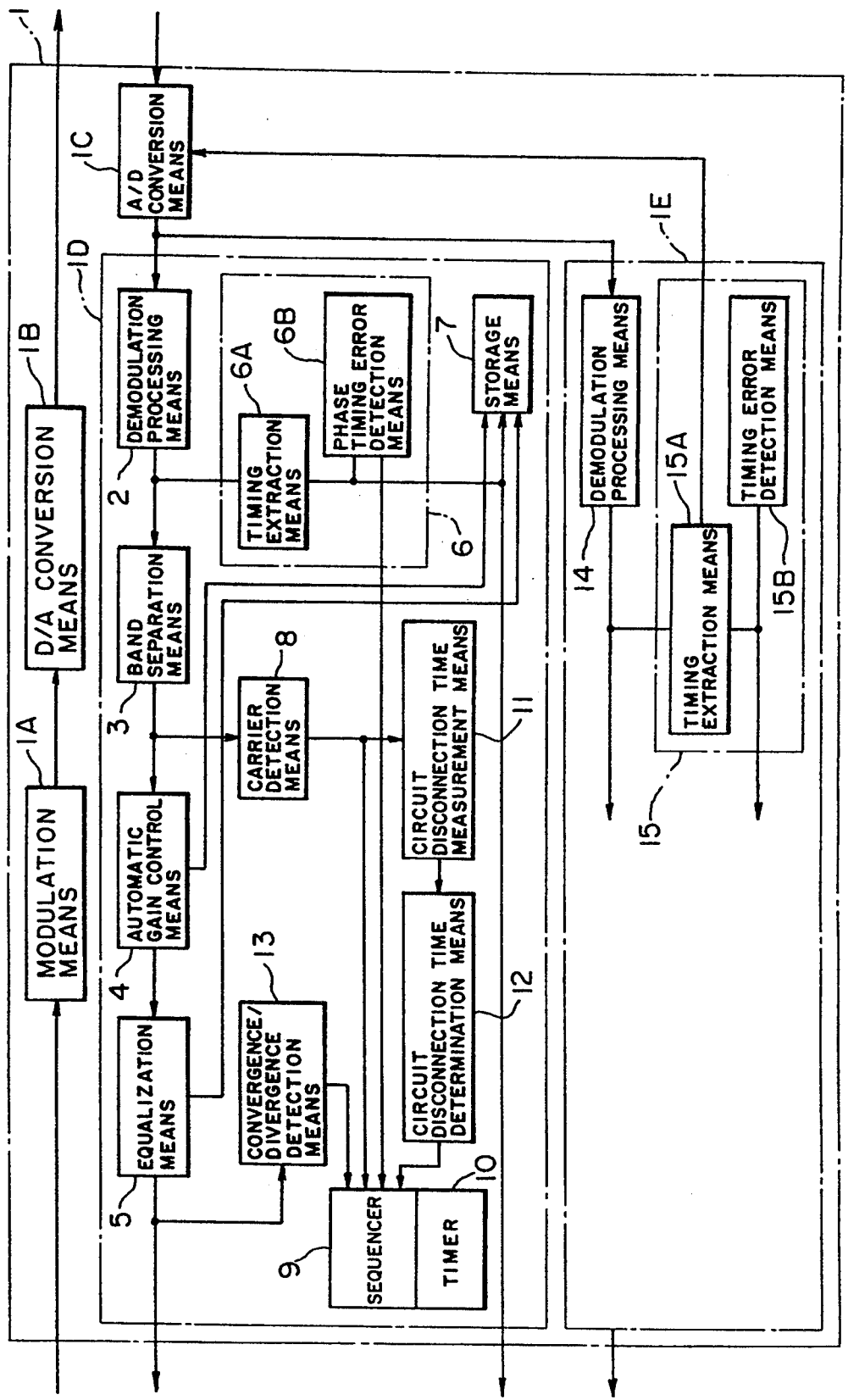
FIG. 1 is a block diagram illustrating the principle of the present invention.

FIG. 1 illustrates, in block diagram, the principle of a modulation and demodulation system to which the present invention is applied. Referring to FIG. 1, the modulation and demodulation system is generally constructed so as to modulate and transmit main data and secondary data in a main channel for main data and a secondary channel for secondary data obtained by frequency division, respectively, and demodulate a receive signal to reproduce such main data and secondary data. The modulation and demodulation system includes modulation means 1A, digital to analog (D/A) conversion means 1B, analog to digital (A/D) conversion means 1C, main data demodulation means 1D and secondary data demodulation means 1E.

The modulation means 1A modulates and outputs main data and secondary data, and the digital to analog conversion means 1B converts a digital signal from the modulation means 1A into an analog signal and outputs the analog signal to an analog circuit.

The analog to digital conversion means 1C converts a receive signal from the analog circuit into a digital signal to allow subsequent demodulation processing, and the main data demodulation means 1D demodulates the receive signal, which has been converted into a digital signal by the analog to digital conversion means 1C, to reproduce main data while the secondary data demodulation means 1E demodulates the receive signal, which has been converted into a digital signal by the analog to digital conversion means 1C, to reproduce secondary data.

The main data demodulation means 1D includes demodulation processing means 2, band separation means 3, automatic gain control means 4 and equalization means 5 as well as timing reproduction means 6, storage means 7, carrier detection means 8, a sequencer 9, a timer 10, circuit disconnection time measurement means 11, circuit disconnection time determination means 12, and convergence/divergence detection means 13.

The demodulation processing means 2 digitally demodulates a digital receive signal of main data sampled by the analog to digital conversion means 1C, and the band separation means 3 performs band separation processing of the output of the demodulation processing means 2. The automatic gain control means 4 adjusts the loop gain so that the level of the demodulation signal band-limited by the band separation means 3 may be a predetermined reference value and outputs the demodulation signal of the adjusted level. The equalization means 5 performs equalization processing of the receive signal.

The timing reproduction means 6 reproduces timing information from a demodulation signal of main data from the demodulation processing means 2 and includes timing extraction means 6A and phase timing error detection means 6B. The timing extraction means 6A extracts phase timing information from a demodulation signal of main data (main channel), and the phase timing error detection means 6B extracts an error of phase timing information extracted by the timing extraction means 6A.

The storage means 7 temporarily stores phase timing information extracted by the timing extraction means 6A when such phase timing information is to be temporarily saved in accordance with the necessity. The carrier detection means 8 detects a carrier from an output signal of the band separation means 3, and the sequencer 9 controls a demodulation processing operation when it receives a carrier detection signal from the carrier detection means 8 as trigger information.

The timer 10 counts the elapsed time after the main data demodulation means 1D starts its demodulation operation of main data. Here, the timer 10 starts its counting operation from a main data demodulation processing starting point set at a point of time when a carrier detection signal is received from the carrier detection means 8.

The circuit disconnection time measurement means 11 measures the circuit disconnection time after the result of detection by the carrier detection means 8 changes from presence of a carrier to absence of a carrier until the result of detection changes back to presence of a carrier. The circuit disconnection time determination means 12 compares a measured time from the circuit disconnection time measurement means 11 with a preset predetermined time. The convergence/divergence detection means 13 receives an output signal of the equalization means 5 and refers to signal points (included in the demodulation signal) having a particular eye pattern, which has been generated upon modulation and demodulation, to detect and determine convergence/divergence of the eye pattern.

Meanwhile, the secondary data demodulation means 1E includes demodulation processing means 14 and timing reproduction means 15.

The demodulation processing means 14 digitally demodulates a digital receive signal of secondary data sampled by the analog to digital conversion means 1C.

The timing reproduction means 15 reproduces timing information from a demodulation signal of secondary data from the demodulation processing means 14 and includes timing extraction means 15A and timing error detection means 15B. The timing extraction means 15A extracts timing information from a demodulation signal of secondary data (secondary channel). A frequency timing extracted by the timing extraction means 15A is used as a sampling timing for sampling a reception analog signal of main data and secondary data from the analog to digital conversion means 1C. The timing error detection means 15B detects an error of timing information extracted by the timing extraction means 15A.

In the modulation and demodulation system of the present invention described above, main data and secondary data are modulated and transmitted by the modulation means 1A in a main channel for main data and a secondary channel for secondary data obtained by frequency division, respectively. On the other hand, a receive signal is demodulated by the main data demodulation means 1D and the secondary data demodulation means 1E to reproduce such main data and secondary data, respectively. In this instance, when demodulation processing of the main data is performed by the main data demodulation means 1D, a frequency timing extracted from the secondary channel by the timing reproduction means 15 (timing extraction means 15A) of the secondary data demodulation means 1E is used as a timing for sampling a digital value of the main data from the analog to digital conversion means 1C.

In the modulation and demodulation system according to the first aspect of the present invention, when an error is detected by the phase timing error detection means 6B, the main data demodulation means 1D performs demodulation processing of main data using phase timing information stored in the storage means 7.

On the other hand, in the modulation and demodulation system according to the second aspect of the present invention, when an error is detected by the phase timing error detection means 6B, the main data demodulation means 1D immediately performs re-leading-in processing of timing information.

Further, in the modulation and demodulation system according to the third aspect of the present invention, when an error is detected by the phase timing error detection means 6B while no error is detected by the timing error detection means 15B of the secondary demodulation means 1E, the main data demodulation means 1D performs demodulation processing of main data using phase timing information stored in the storage means 7, but when an error is detected by the phase timing error detection means 6B and an error is detected also by the timing error detection means 15B, the main data demodulation means 1D performs re-leading-in processing of timing information.

It is to be noted that, if, while an error detection operation is performed by the phase timing error detection means 6B during detection of a carrier by the carrier detection means 8, the carrier detection means 8 detects a change from a carrier presence detection condition (presence of a carrier) to a carrier absence detection condition (absence of a carrier), then last phase timing information extracted from the main channel by the timing extraction means 6A is stored into the storage means 7.

Further, when a carrier is detected again by the carrier detection means 8 after the last phase timing information has been stored into the storage means 7, the main data demodulation means 1D performs demodulation processing of main data using the last phase timing information stored in the storage means 7.

In this instance, the circuit disconnection time measurement means 11 measures a circuit disconnection time after the result of detection by the carrier detection means 8 changes from presence of a carrier to absence of a carrier until the result of detection changes back to presence of a carrier. Then, if the circuit disconnection time determination means 12 determines that the measurement time is longer than the preset predetermined time, the main data demodulation means 1D may perform re-leading-in processing of timing information.

Further, the timer 10 counts the elapsed time after a main data demodulation processing starting point by the main data demodulation means 1D, and only when the count time exceeds a predetermined time, an error detection operation of the phase timing error detection means 6B may be performed.

Furthermore, when the main data demodulation means 1D performs demodulation processing of main data using phase timing information stored in the storage means 7, the convergence/divergence detection means 13 detects and determines convergence/divergence of an eye pattern, and when it is determined that the eye pattern converges, the main data demodulation means 1D continues the demodulation processing of main data using the phase timing information. But on the contrary when the convergence/divergence detection means 13 determines that the eye pattern diverges, the main data demodulation means 1D performs re-leading-in operation of timing information.

Accordingly, with the modulation and demodulation system of the present invention, the following effects or advantages can be achieved.

1. When a timing error is detected upon demodulation processing of main data, timing information which has been stored last into the storage means is read out to continue the demodulation processing of main data, and consequently, the modulation and demodulation system itself can rapidly restore its demodulation processing condition in which normal timing information is used.

2. A timing error detection operation can be performed avoiding an unstable condition at an instant immediately after transition to a data sequence, and it can be prevented with certainty that, while the timing is normal, a timing error is detected in error, resulting in a disabled condition of communication.

3. When a timing error is detected, timing information re-leading-in processing is entered immediately, and consequently, occurrence of a periodic error which arises from an unstable condition of timing information from the secondary channel can be prevented with certainty, and the modulation and demodulation system itself can restore a demodulation processing condition in which normal timing information is used. Consequently, a normal communication condition can be maintained.

4. Since presence or absence of a variation error of timing information of secondary data is detected and re-leading-in processing of timing information is entered only when presence of a variation error is detected, when there is no variation error, demodulation processing is performed using timing information stored in the storage means without performing re-leading-in of timing information. Consequently, the modulation and demodulation system itself can restore a demodulation processing condition in which normal timing information is used without taking wasteful time for timing re-leading-in processing.

5. When the circuit disconnection time is long, re-leading-in processing of timing information is entered immediately, and consequently, wasteful processing time can be omitted and the modulation and demodulation system itself can further rapidly restore a demodulation processing condition in which normal timing information is used.

b. Description of the First Embodiment

Figure 2:
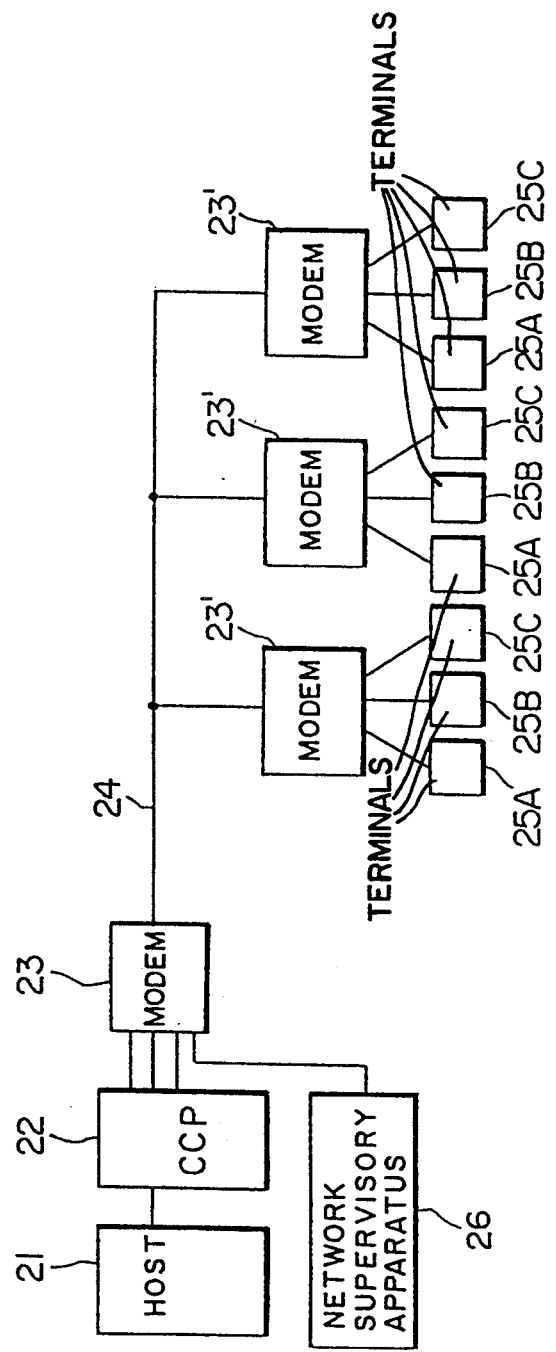
FIG. 2 is a block diagram of an on-line system showing a first preferred embodiment of the present invention.

Now, a first preferred embodiment of the present invention is described in detail. Referring first to FIG. 2, there is shown an on-line system to which the present invention is applied. The on-line system shown includes a modem 23 connected to a host computer 21 by way of a communication control apparatus (CCP) 22 and serving as a parent station. A plurality of modems 23' are connected to the modem 23 by way of a transmission line 24. The modems 23' are installed at different locations from the modem 23 and each serves as a child station. A plurality of terminals 25A to 25C are connected to each modem 23'. The on-line system further includes a network supervisory apparatus 26.

Figure 5:
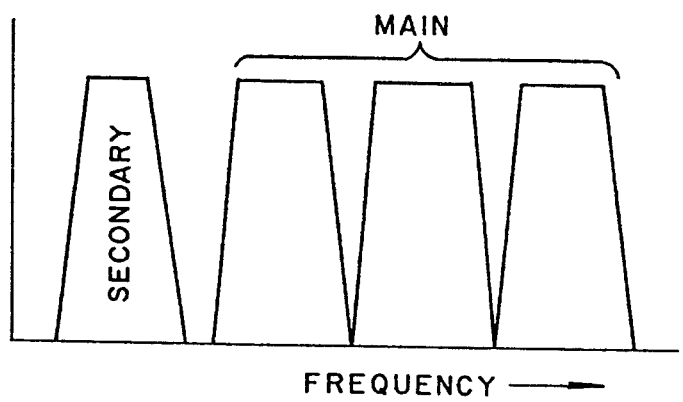
FIG. 5 is a diagram showing frequency bands of a main channel and a secondary channel used in the on-line system of FIG. 2.

Each of the modems 23 and 23' divides a voice band, for example, into three main channels for main data and a secondary channel for secondary data for network supervision as seen in FIG. 5 by frequency division and generates, upon transmission, signal points having a predetermined eye pattern to modulate and transmit data (main data and secondary data), whereas it demodulates, upon reception, a receive signal to reproduce data (main data and secondary data). Thus, as shown in FIG. 2, the child station modems 23' can be connected by multi-point connection to the parent station modem 23 by way of the common transmission line 24.

Figure 3:
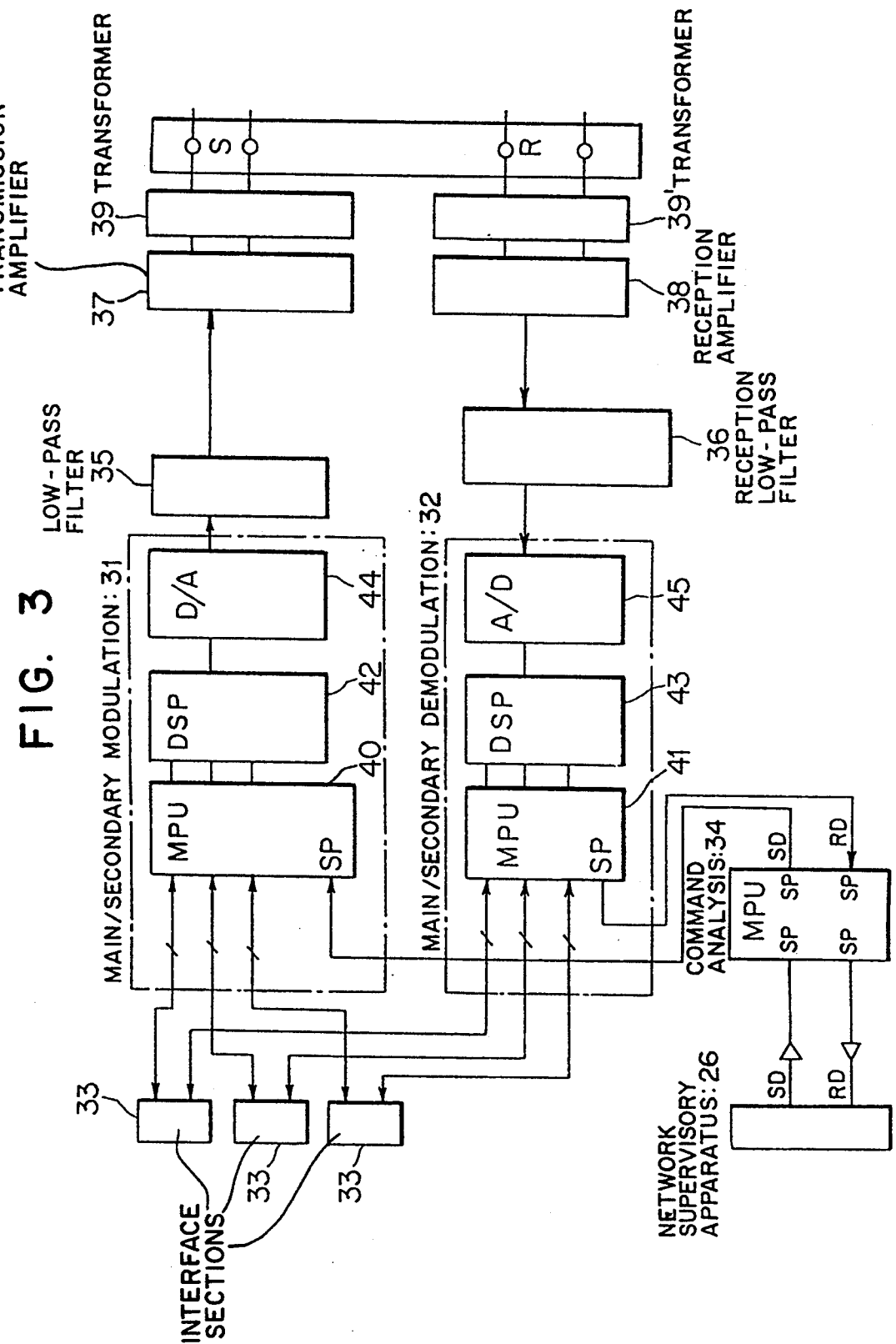
FIG. 3 is a block diagram of essential part of a modem employed in the on-line system shown in FIG. 2.

Referring now to FIG. 3, in order for the modem 23 to exhibit such functions as described just above, it includes a main/secondary modulation section 31 and a main/secondary demodulation section 32, and further includes a plurality of interface sections 33 with the communication control apparatus 22, and a command analysis section 34 interposed between the modem 23 and the network supervisory apparatus 26. The modem 23 further includes a transmission low-pass filter 35, a reception low-pass filter 36, a transmission amplifier 37, a reception amplifier 38 and a pair of transformers 39 and 39'.

Each of the interface sections 33 connects the communication control apparatus 22 and the modem 23 to each other with a synchronous interface (RS232C). The command analysis section 34 performs an analysis of a command from the network supervisory apparatus 26 and production of a response to the network supervisory apparatus 26 and has a function of transferring transmission or reception data SD or RD by way of serial ports SP thereof by high speed serial transfer. Further, the command analysis section 34 connects the network supervisory apparatus 26 and the modem 23 to each other with a start-stop interface (RS485).

The main/secondary modulation section 31 includes a microprocessor unit (MPU) 40, a digital signal processor (DSP) 42 and a digital to analog (D/A) converter 44. The main/secondary demodulation section 32 includes an MPU 41, a DSP 43 and an analog to digital (A/D) converter 45. The MPUs and DSPs constituting the main/secondary modulation section 31 and the main/secondary demodulation section 32 may individually be provided by suitable plural numbers depending upon the capacity or processing faculty of the modem 23.

Figure 4:
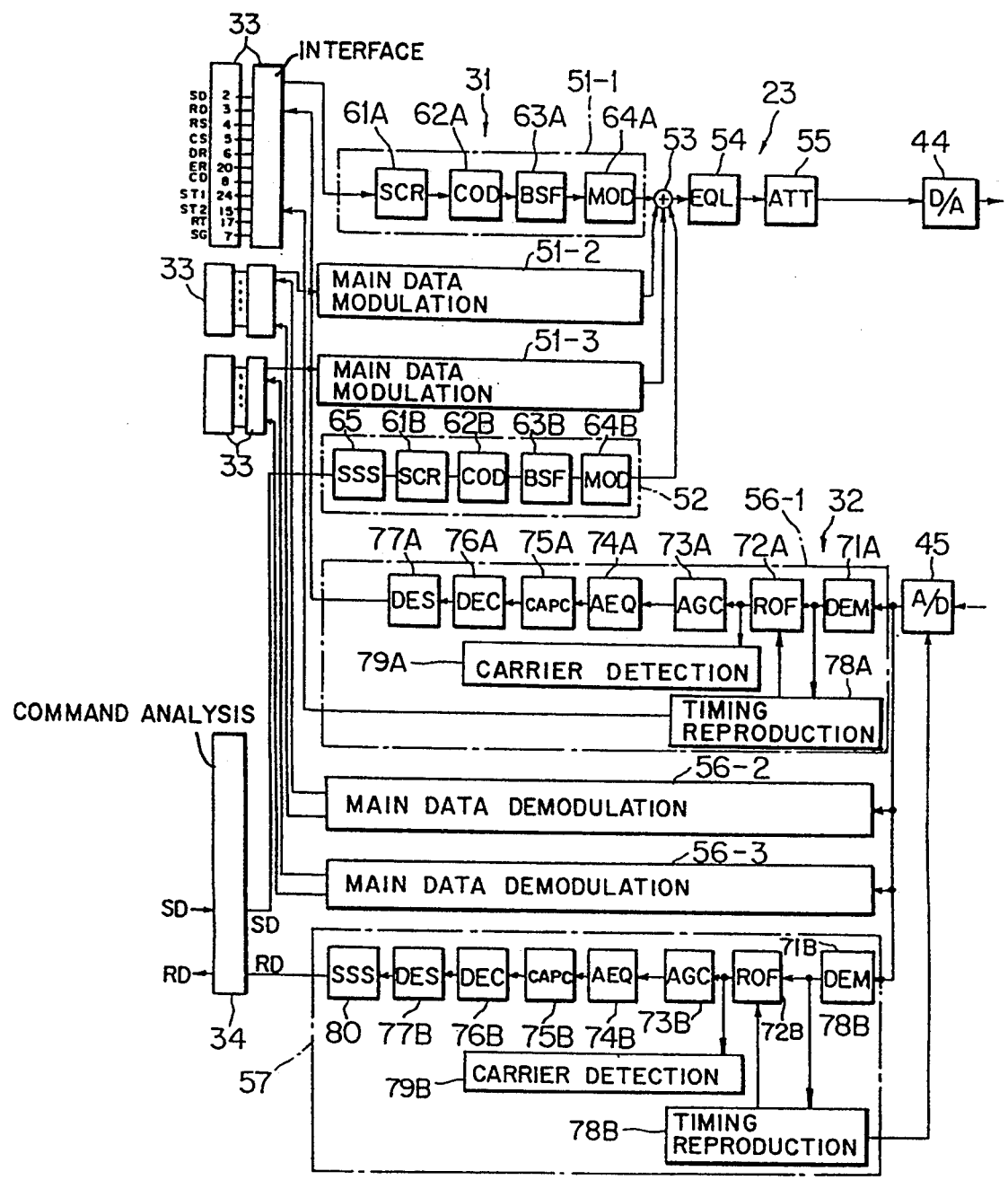
FIG. 4 is a block diagram showing details of the modem shown in FIG. 3.

Now, essential part of the modem 23 will be described in more detail. Referring now to FIG. 4, the modem 23 includes, in the main/secondary modulation section 31, three main data modulation sections 51-1, 51-2 and 51-3 and a secondary data modulation section 52 as well as an addition section 53, a fixed equalizer 54 (EQL) and a transmission attenuator (ATT) 55.

The main data modulations section 51-1 to 51-3 modulate main data and are provided by a number equal to the number of channels, that is, 3. Each of the main data modulation sections 51-1 to 51-3 includes a scrambler (SCR) 61A, a code conversion section (COD) 62A, a transmission base band filter (BSF) 63A and a modulation section (MOD) 64A. It is to be noted that, while the detailed construction is shown only of the main data modulation section 51-1 in FIG. 4, also the other main data modulation sections 51-2 and 51-3 have the same construction as described above.

Here, the scrambler 61A scrambles a signal into a random signal, and the code conversion section 62A performs desired code conversion for the output of the scrambler 61A. Upon such code conversion, the code conversion section 62A generates a signal point having a desired eye pattern (data point plot pattern on a phase plane).

The transmission base band filter 63A passes a base band component of a digital output of the code conversion section 62A, and the modulation section 64A modulates the output of the base band filter 63A with a corresponding main channel frequency.

Meanwhile, the secondary data modulation section 52 modulates secondary data and includes a start-stop synchronization conversion section (SSS) 65, a scrambler (SCR) 61B, a code conversion section (COD) 62B, a transmission base band filter (BSF) 63B, and a modulation section (MOD) 64B.

Here, the start-stop synchronization conversion section 65 performs conversion processing from a start-stop interface to a synchronization interface, and the scrambler 61B, the code conversion section 62B, the transmission base band filter 63B and the modulation section 64B have similar functions to those of the scrambler 61A, the code conversion section 62A, the transmission base band filter 63A and the modulation section 64A, respectively. It is to be noted that the modulation frequency at the modulation section 64B is the secondary channel frequency.

It is to be noted that the transmission MPU 40 shown in FIG. 3 has the functions of the scramblers 61A and the code conversion sections 62A of the main data conversion sections 51-1 to 51-3 and the start-stop synchronization conversion section 65, the scrambler 61B and the code conversion section 62B of the secondary data conversion section 52, and the transmission DSP 42 shown in FIG. 3 has the functions of the transmission base band filters 63A and the modulation sections 64A of the main data conversion sections 51-1 to 51-3, the base band filter 63B and the modulation section 64B of the secondary data conversion section 52, the addition section 53, the fixed equalizer 54 and the transmission attenuator 55.

Further, the modem 23 includes, in the main/secondary demodulation section 32, three main data demodulation sections 56-1, 56-2 and 56-3 and a secondary data demodulation section 57.

The main data demodulation sections 56-1 to 56-3 demodulate main data and are provided also by a number equal to the number of channels, that is, 3. Each of the main data demodulation sections 56-1 to 56-3 includes a demodulation section 71A, a roll-off filter (band separation filter; ROF) 72A, an automatic gain control section (AGC) 73A, an automatic equalization section (AEQ) 74A, a carrier phase correction section (CAPC) 75A, a code conversion section (DEC) 76A and a descrambler (DES) 77A as well as a timing reproduction section 78A, a carrier detection section 79A and a sequencer 81A. It is to be noted that, while only the detailed construction is shown only of the main data demodulation section 56-1 in FIG. 4, also the other main data demodulation sections 56-2 and 56-3 have the same construction as described above.

Here, the demodulation section 71A applies demodulation processing to a receive signal after digital conversion by the A/D converter 45, and the roll-off filter 72A passes only a signal of a predetermined frequency range of the digital output of the demodulation section 71A. A transversal filter is used for the demodulation section 71A. Further, where the main channel is divided into a plurality of (three) channels as in the present embodiment, the frequency cut-off characteristic of the roll-off filter 72A must necessarily be set steep from the necessity to narrow the band widths to make a rigid distinction between each adjacent frequencies, and to this end, the roll-off rate (ROF rate) of the roll-off filter 72A is set low (for example, to 3 to 5% or so).

The automatic gain control section 73A constitutes automatic receive level adjustment means for adjusting the loop gain so that the level of the demodulation signal band-limited by the roll-off filter 72A may be equal to a predetermined reference value and inputting the demodulation signal to the automatic equalization section 74A at the next stage. The automatic gain control section 73A is required to allow the automatic equalization section 74A at the next stage to operate accurately.

The automatic equalization section 74A performs equalization processing for correcting a transmission distortion and so forth of the circuit, and the carrier phase correction section 75A corrects the phase of a carrier from the output of the automatic equalization section 74A.

The code conversion section 76A decodes a coded signal of the output of the carrier phase correction section 75A, and the descrambler 77A descrambles an output of the code conversion section 76A, which is in a scrambled condition as a result of processing at the scrambler 61A in the main/secondary modulation section 31, back into an original signal.

The timing reproduction section 78A extracts a signal timing from the output of the demodulation section 71A and determines where a signal timing is present. The output of the timing reproduction section 78A is supplied to the roll-off filter 72A and the corresponding interface circuit 33.

The carrier detection section 79A detects a carrier to detect whether data have been received, and the output of the carrier detection section 79A is supplied to the sequencer 81A and thus provides trigger information to the sequencer 81A. When a carrier detection signal is received as trigger information from the carrier detection section 79A, the sequencer 81A performs control of a demodulation processing operation.

Meanwhile, the secondary data demodulation section 57 demodulates secondary data and includes a demodulation section (DEM) 71B, a roll-off filter (band separation filter; ROF) 72B, an automatic gain control section (AGC) 73B, an automatic equalization section (AEQ) 74B, a carrier phase correction section (CAPC) 75B, a code conversion section (DEC) 76B, a descrambler section (DES) 77B, and a synchronization to start-stop conversion section (SSS) 80 as well as a timing reproduction section 78B, a carrier detection section (CD detection section) 79B, and a sequencer 81B.

Here, the synchronization to start-stop conversion section 80 performs conversion processing from a synchronization interface to a start-stop interface, and the demodulation section 71B, the roll-off filter 72B, the automatic gain control section 73B, the automatic equalization section 74B, the carrier phase correction section 75B, the code conversion section 76B, the descrambler section 77B, the timing reproduction section 78B, the carrier detection section 79B and the sequencer 81B have similar functions to those of the demodulation section 71A, the roll-off filter 72A, the automatic gain control section 73A, the automatic equalization section 74A, the carrier phase correction section 75A, the code conversion section 76A, the descrambler section 77A, the timing reproduction section 78A, the carrier detection section 79A and the sequencer 81A, respectively.

However, the roll-off filter 72B of the secondary data demodulation section 57 need not necessarily have a steep frequency cut-off characteristic since the secondary channel is not divided any more, and accordingly, the roll-off rate (ROF rate) of the roll-off filter 72B is set high comparing with the roll-off filters 72A for the main channels, for example, to 30 to 40%.

Meanwhile, the timing reproduction section 78B of the secondary data demodulation section 57 extracts a signal timing from the output of the demodulation section 71B and determines where a signal timing is present. Then, the output of the timing reproduction section 78B is supplied to the roll-off filter 72B and the A/D converter 45. Accordingly, the frequency timing of the secondary data is used as a sampling timing for a digital value by the A/D converter 45. The reason why the frequency timing of the secondary data is used as a sampling timing for a digital value by the A/D converter 45 is that the ROF rate in the main channels is so low that it is difficult to extract a timing component from any of the main channels.

It is to be noted that the reception DSP 43 shown in FIG. 3 has the functions of the demodulation sections 71A, the roll-off filters 72A, the automatic gain control sections 73A, the automatic equalization sections 74A, the carrier phase correction sections 75A, the timing reproduction sections 78A and the carrier detection sections 79A of the main data demodulation sections 56-1 to 56-3 and the demodulation section 71B, the roll-off filter 72B, the automatic gain control section 73B, the automatic equalization section 74B, the carrier phase correction section 75B, the timing reproduction section 78B and the carrier detection section 79B of the secondary data demodulation section 57, and the reception MPU 41 shown in FIG. 3 has the functions of the code conversion sections 76A, the descramblers 77A and the sequencers 81A of the main data demodulation sections 56-1 to 56-3 and the code conversion section 76B, the descrambler 77B, the synchronization to start-stop conversion section 80 and the sequencer 81B of the secondary data demodulation section 57.

It is to be noted that also the modems 23' serving as child stations have a substantially same construction as the modem 23 serving as the parent station. Further, in FIG. 4, illustration of such a detailed construction as described below with reference to FIG. 6 is omitted.

Figure 6:
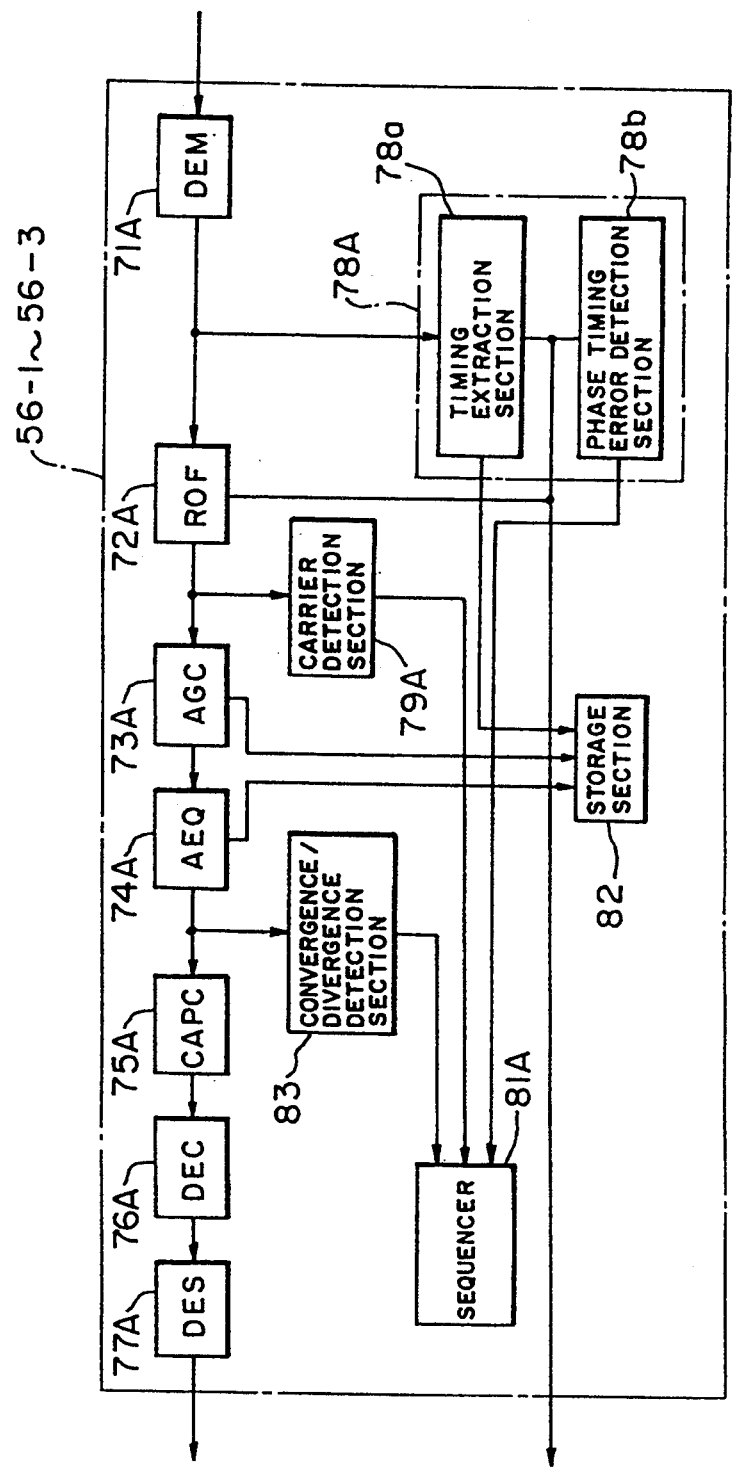
FIG. 6 is a block diagram showing details of a main data demodulation section of the modem shown in FIG. 3.

By the way, the main data demodulation sections 56-1 to 56-3 of the modem shown in FIG. 4 have such a more detailed construction as shown in FIG. 6. In FIG. 6, like reference characters to those of the FIG. 4 denote like components, and overlapping description thereof is omitted herein to avoid redundancy.

Referring to FIG. 6, the timing reproduction section 78A of each of the main data demodulation sections 56-1 to 56-3 reproduces timing information from a demodulation signal of main data from the demodulation section 71A and includes a timing extraction section 78a for extracting timing information from a demodulation signal of main data (main channel), and a phase timing error detection section 78b for detecting an error of phase timing information extracted from the timing extraction means 78a.

Each of the main data demodulation sections 56-1 to 56-3 further includes a storage section 82 which can store timing Information in order to temporarily save, when necessary, timing information extracted by the timing extraction section 78a. The storage section 82 can store therein, in addition to such timing information, automatic gain control information of the automatic gain control section 73A or automatic equalization information of the automatic equalization section 74A when such information is to be temporarily saved.

Each of the main data demodulation sections 56-1 to 56-3 further includes a convergence/divergence detection section 83 which receives an output signal of the automatic equalization section 74A and refers to signal points (included in the demodulation signal) having a particular eye pattern, which has been generated upon modulation and transmission, to detect and determine convergence/divergence of the eye pattern. The outputs of the phase timing error detection section 78b and the convergence/divergence detection section 83 are inputted together with the output of the carrier detection section 79A to the sequence 81A.

With the modulation and demodulation system of the construction described above, upon transmission, main data are modulated in the respective main channels by the main data modulation sections 51-1 to 51-3 while secondary data are modulated in the secondary channel by the secondary data modulation section 52, and the outputs of the modulation sections 51-1 to 51-3 and 52 are added by the adder 53 and then processed successively by required processing by the fixed equalizer 54 and the transmission attenuator 55. The output of the transmission attenuator 55 is converted into an analog signal by the digital to analog converter 44 and then sent into the analog circuit 24.

Meanwhile, on the reception side, a receive signal is converted from an analog signal into a digital signal by the analog to digital converter 45, and from the digital signal, main data are demodulated and reproduced by the main data demodulation sections 56-1 to 56-3 and secondary data are demodulated and reproduced by the secondary data demodulation section 57. In this instance, demodulation and reproduction processing of main data proceeds such that a digital value (the output of the analog to digital converter 45) is sampled at a frequency timing extracted from the secondary channel by the timing reproduction section 78B of the secondary data demodulation section 57, and demodulation and reproduction processing is performed by the timing reproduction section 78A of each of the main data demodulation sections 56-1 to 56-3 using a phase timing extracted from a main channel carrier.

Figure 7:
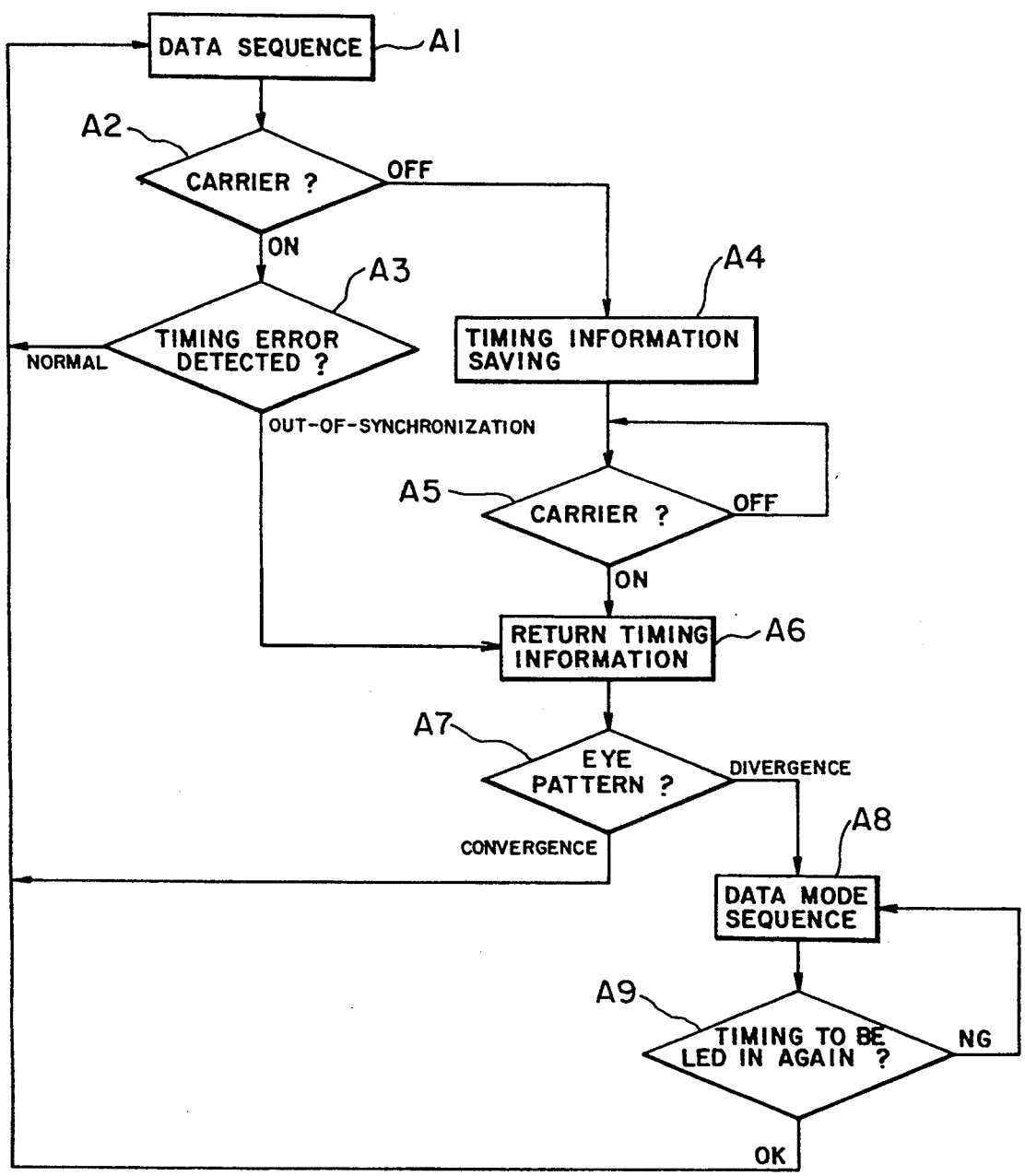
FIG. 7 is a flow chart illustrating operation of the modem shown in FIG. 3.

Since each of the main data demodulation sections 56-1 to 56-3 uses a frequency timing from the secondary channel as a sampling timing for a digital value while it uses a timing extracted from the main channels for demodulation processing thereof, a timing error (an out-of-synchronization condition) sometimes occurs upon demodulation processing of main data. However, in the present embodiment, when such a timing error occurs, the modulation and demodulation system itself can restore its demodulation processing based on a normal timing in accordance with such a procedure as illustrated in FIG. 7.

In particular, if a carrier is detected and reception of data is detected by the carrier detection section 79A, the detection signal is supplied as a trigger signal to the sequencer 81A of a corresponding one of the main data demodulation sections 56-1 to 56-3. Consequently, the main data demodulation section 56-1, 56-2 or 56-3 enters, by the sequencer 81A thereof, a data sequence as a demodulation processing operation of main data as seen from FIG. 7 (step A1). After the data sequence is entered, the main data demodulation section 56-1, 56-2 or 56-3 repetitively detects whether or not a carrier is detected from the demodulation signal by the carrier detection section 79A (whether or not data are received) (step A2).

If it is detected that a carrier is detected by the carrier detection section 79A, that is, presence of a carrier is detected or the output of the carrier detection section 79A is in an on state, then an error detection operation is performed by the phase timing error detection section 78b of the timing reproduction section 78A (step A3). Then, if the phase timing error detection section 78b determines that the phase timing has no error and accordingly is normal, the control sequence returns to step A1. Consequently, unless either absence of a carrier is detected at step A2 or a phase timing error, that is, an out-of-synchronization condition, is detected at step A3, the loop of steps A1, A2 and A3 is followed repetitively so that the main data reproduction section 56-1, 56-2 or 56-3 successively performs demodulation processing of main data using timing information extracted by the timing extraction section 78a.

On the other hand, if the carrier detection section 79A detects, at step A2, a carrier presence detection condition (i.e., no carrier), that is, a circuit disconnection condition, then the output of the carrier detection section 79A is changed over from an on state to an off state, and last timing information extracted from the main channel by the timing extraction section 78a is temporarily saved or stored into the storage section 82 (step A4).

In this instance, not only the timing information, but also automatic gain control information of the automatic gain control section 73A and automatic equalization information of the automatic equalization section 74A are temporarily saved or stored into the storage section 82.

Thereafter, when a carrier is detected again by the carrier detection section 79A (step A5), each of the main data demodulation sections 56-1 to 56-3 reads out the last timing information stored in the storage section 82 and resumes demodulation processing of main data using the timing information (step A6).

On the other hand, if a phase timing error, that is, an out-of-synchronization condition, is detected by an error detection operation of the phase timing error detection section 78b of the timing reproduction section 78A at step A3 (that is, when the phase of the demodulation signal (demodulation vector signal) exceeds a predetermined threshold level), the control sequence advances to step A6, at which the timing information which has been saved or stored into the storage section 82 immediately before the present phase timing error is detected is read out and demodulation processing of main data is continued using the thus read out timing information.

In the meantime, if the timing information stored in the storage section 82 is returned, at step A6, as timing information for demodulation processing of main data to resume or continue demodulation processing, the convergence/divergence section 83 detects and determines a convergence/divergence condition of an eye pattern (step A7).

Normally, upon modulation and transmission, main data are converted into signal points having a particular eye pattern (a data point arrangement pattern on a phase plane) by code conversion by the code conversion section 62A of each of the main data modulation sections 51-1 to 51-3.

Then, on the demodulation side, the convergence/divergence detection section 83 of each of the main data demodulation sections 56-1 to 56-3 receives an output signal of the automatic equalization section 74A and refers to signal points having such a particular eye pattern generated upon modulation and transmission to detect and determine whether or not the eye pattern converges or diverges.

If the convergence/divergence detection section 83 determines that the eye pattern converges, the control sequence returns to step A1 to continue ordinary demodulation processing of main data. On the contrary if the convergence/divergence detection section 83 determines that the eye pattern diverges, the result of determination is sent out to the sequencer 81A, and the corresponding one of the main data demodulation sections 56-1 to 56-3 enters a data mode sequence in which re-leading-in processing of timing information is performed by the timing extraction section 78a of the timing reproduction section 78A (step A8). Then, the data mode sequence is repeated until re-leading-in of timing information is performed based on the judgment at step A9. Thus, after re-leading-in of timing information is performed, the control sequence returns to the data sequence (step A1).

In this manner, with the modulation and demodulation system of the first embodiment of the present invention, when a timing error (an out-of-synchronization condition) is detected, upon demodulation processing of main data, by the phase timing error detection section 78b, timing information which has been stored last into the storage section 82 is read out and demodulation processing of main data is repeated, and accordingly, the modulation and demodulation system itself can rapidly restore its demodulation processing condition in which normal timing information is used.

Further, if the circuit restores its normal condition (the condition of presence of a carrier) after a circuit disconnection condition is detected by the carrier detection section 79A, then demodulation processing of main data is resumed rapidly based on the timing information, which has been stored immediately before the circuit disconnection occurs, without performing re-leading-in of timing information.

However, when demodulation processing is to be performed using timing information of the storage section 82, convergence/divergence of an eye pattern is detected and determined by the convergence/divergence detection section 83, and when the eye pattern diverges, re-leading-in processing of timing information (the data mode sequence) is entered immediately to lead in normal timing information.

c. Description of the Second Embodiment

Figure 8:
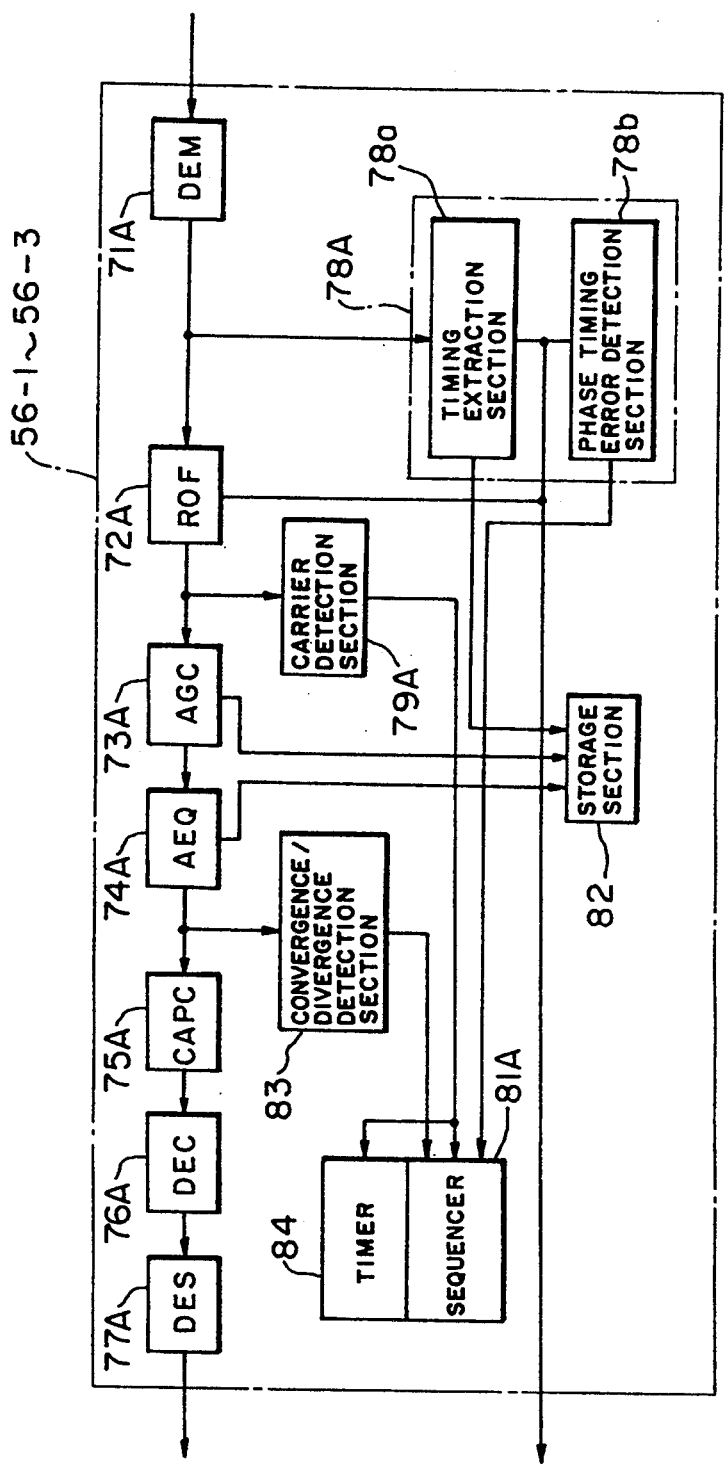
FIG. 8 is a block diagram of a main data demodulation section of another modem showing a second preferred embodiment of the present invention.

FIG. 8 shows a detailed construction of a main data demodulation section of a modulation and demodulation system according to a second preferred embodiment of the present invention. The main data demodulation section in the present embodiment is a modification and has a substantially similar construction to the main data demodulation sections 56-1 to 56-3 in the first embodiment described above but is different from them in that it additionally includes a timer 84.

Figure 9:
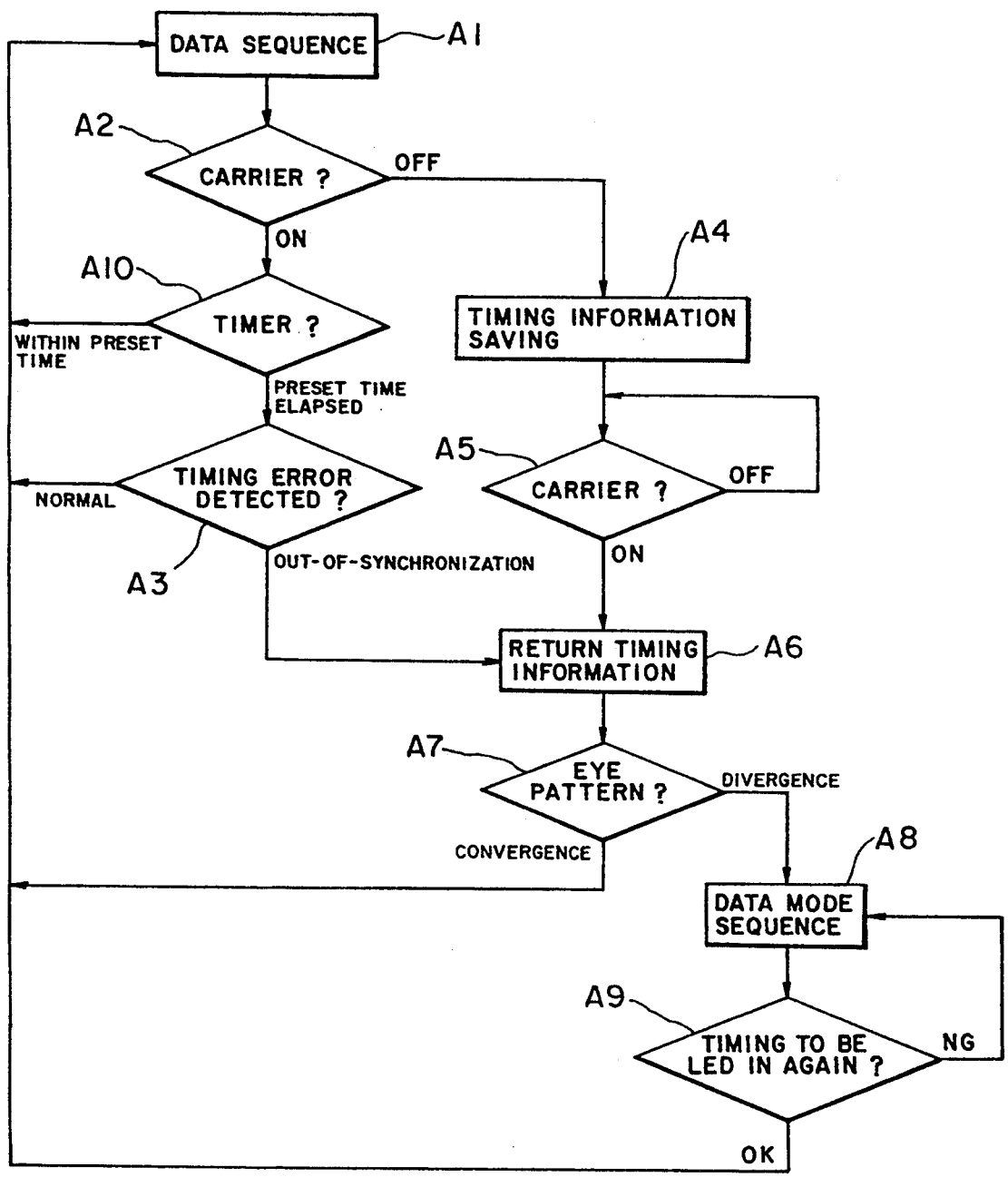
FIG. 9 is a flow chart illustrating operation of the modem of the second embodiment.

The timer 84 counts the elapsed time after a main data demodulation processing starting time by the corresponding one of the main data demodulation means 56-1 to 56-3, that is, a data sequence entering time or a point of time at which a carrier detection signal from the carrier detection section 78b is inputted as a trigger signal to the sequencer 81A. Due to the additional provision of the timer 84, the modulation and demodulation system of the second embodiment itself can restore, when a timing error occurs, its demodulation processing based on a normal timing by way of such a procedure as illustrated in FIG. 9. It is to be noted that, in FIG. 9, like steps at which like processing is performed are denoted by like reference step numbers to those of FIG. 7.

Referring to FIG. 9, similarly as in the first embodiment, when the carrier detection section 79A detects a carrier and reception of data, the detection signal is supplied as a trigger signal to the sequencer 81A so that the corresponding one of the main data demodulation section 56-1 to 56-3 enters a data sequence as a demodulation processing operation of main data as seen from FIG. 9 by the sequencer 81A (step A1).

After the data sequence is entered, counting of time by the the timer 84 is stared while the main data demodulation section 56-1, 56-2 or 56-3 repetitively detects, by means of the carrier detection section 79A thereof, whether or not a carrier is detected from a demodulation signal (step A2), and if the carrier detection section 79A detects a carrier, it is determined whether or not the elapsed time counted by the timer 84 after a main data demodulation processing starting time of the main data demodulation section 56-1, 56-2 or 56-3 is longer than a preset time (step A10).

Here, normally about 8,000 symbols (one symbol requires one demodulation time) are required after the data sequence is entered until the phase timing error detection section 78b comes to a condition wherein it can output a normal detection result, and if an error detection operation by the phase timing error detection section 78b is performed before such time elapses, then even if the timing is in a normal condition, since the condition is unstable, a timing error (an out-of-synchronization condition) may possibly be detected, resulting in a condition wherein communication is impossible.

In the second embodiment, such a timer 84 as described above is provided additionally, and at step A10, it is determined whether or not the time counted by the timer 84, that is, the elapsed time after entering the data sequence, exceeds a preset time, for example, a time for 8,000 symbols. Then, if the elapsed time is within the preset time, then since a wrong result of error detection may possibly be outputted as yet, the control sequence returns to step A1. Thus, after the elapsed time becomes longer than the preset time and consequently a stable condition in which an accurate result of error detection can be obtained is reached, an error detection operation by the phase timing error detection section 78b is performed (step A3). It is to be noted that processing operations at the following steps A4 to A9 are quite similar to those described hereinabove in connection with the first embodiment, and accordingly, overlapping description thereof is omitted herein to avoid redundancy.

In this manner, with the modulation and demodulation system of the second embodiment of the present invention, in addition to the effects or advantages similar to those of the first embodiment, there is an advantage in that, since a condition in which an error detection operation by the phase timing error detection section 78b can be performed is entered avoiding an unstable condition at the time immediately after entering the data sequence, such a situation that an out-of-synchronization condition (a timing error) is detected in error to disable communication while the timing remains normal can be prevented with certainty.

d. Description of the Third Embodiment

Figure 10:
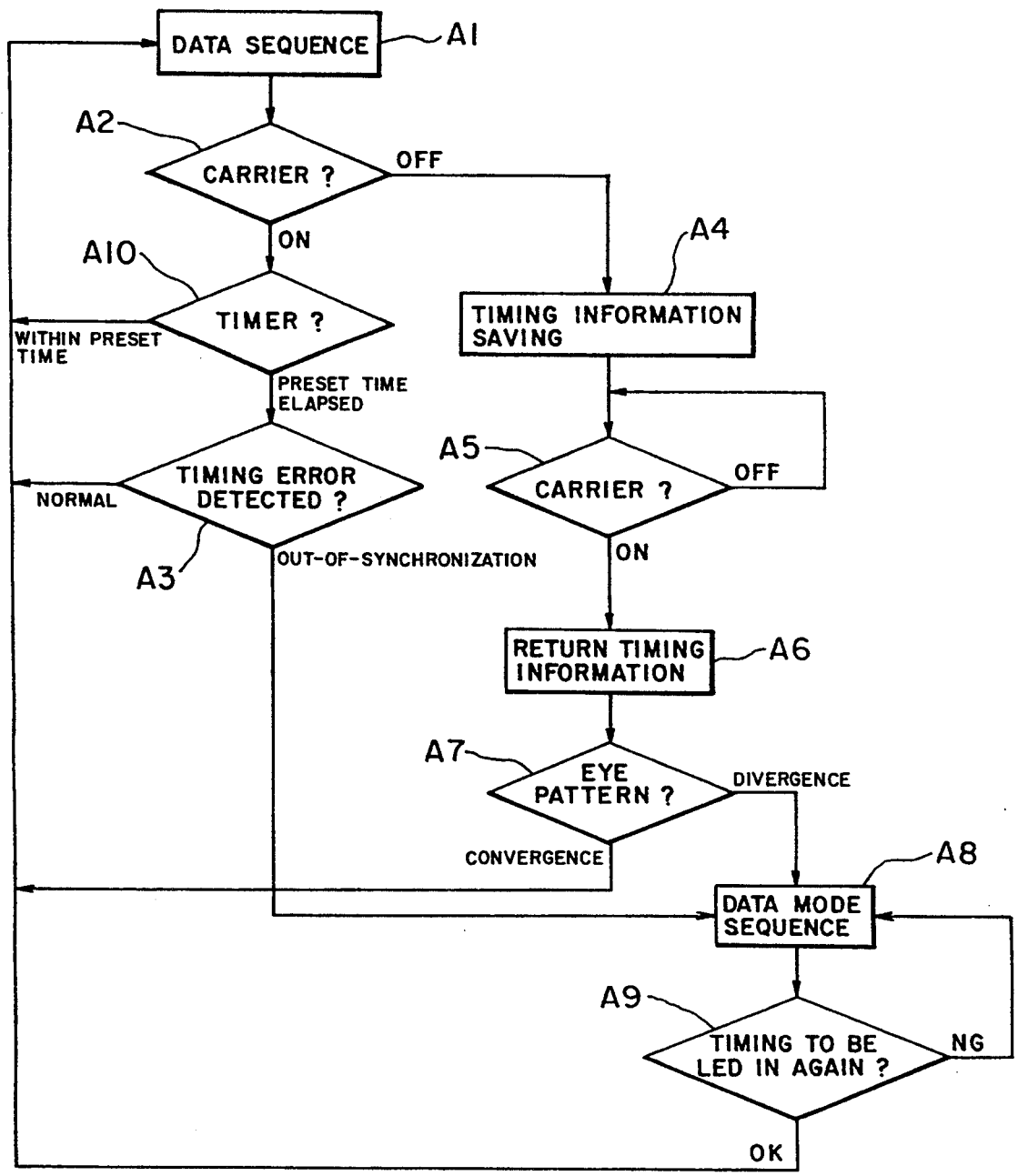
FIG. 10 is a flow chart illustrating operation of a further modem according to a third preferred embodiment of the present invention.

Referring now to FIG. 10, there is shown, in flow chart, operation of a modulation and demodulation system according to a third preferred embodiment of the present invention. The modulation and demodulation system of the present embodiment has a quite same construction as the modulation and demodulation system of the second embodiment described above and accordingly includes such main data demodulation sections as described hereinabove with reference to FIG. 8. The modulation and demodulation system of the present embodiment is thus only different in operation from the modulation and demodulation system of the second embodiment.

In particular, when instantaneous disconnection occurs, if timing information is returned in accordance with the procedure illustrated in FIG. 9, it sometimes occurs that, although the eye pattern converges, the timing error continues. The reason is that, since the timing varies, after the point of time at which the timing information of the secondary channel and the main channel is returned, until the timing PLL (phase-locked loop; not shown) which makes up the timing reproduction section 78B of the secondary data demodulation section 57 becomes stabilized, the timing at each of the main data demodulator sections 56-1 to 56-3 becomes an error. In such an instance, there is the possibility that, with the procedure illustrated in FIG. 9, the loop of the steps A6, A7, A1, A2, A10 and A3 may be repeated to cause an error periodically to disable normal communication.

Therefore, in the third embodiment, as seen from FIG. 10, if a timing error (an out-of-synchronization condition) is detected by the phase timing error detection section 78b at step A3 after the time counted by the timer 84 elapses the preset time in the data sequence, then the main data demodulation section 56-1, 56-2 or 56-3 immediately enters, by the sequencer 81A thereof, a data mode sequence (step AS) in which re-leading-in of timing information is performed without returning timing information from the storage section 82 at step A6. It is to be noted that the processing operation in the present embodiment is quite similar to that described hereinabove in connection with the first embodiment and the second embodiment except that the data mode sequence (step AS) is entered after determination of an out-of-synchronization condition at step A3, and overlapping description of the same is omitted herein to avoid redundancy. It is to be noted that, in FIG. 10, like steps at which like processing is performed are denoted at like reference step numbers to those of FIGS. 7 and 9.

In this manner, with the modulation and demodulation system of the third embodiment of the present invention, when a timing error is detected by the phase timing error detection section 78b, the corresponding one of the main data demodulation sections 56-1 to 56-3 immediately enters the data mode sequence in which re-leading-in operation of timing information is performed. Consequently, occurrence of a periodic error which arises from an unstable condition of the timing PLL of the secondary data demodulation section 57 can be prevented with certainty, and the modulation and demodulation system itself can rapidly restore its demodulation processing condition in which normal timing information is used from another condition in which an error occurs periodically. Consequently, a normal communication condition can be maintained.

e. Description of the Fourth Embodiment

Figure 11:
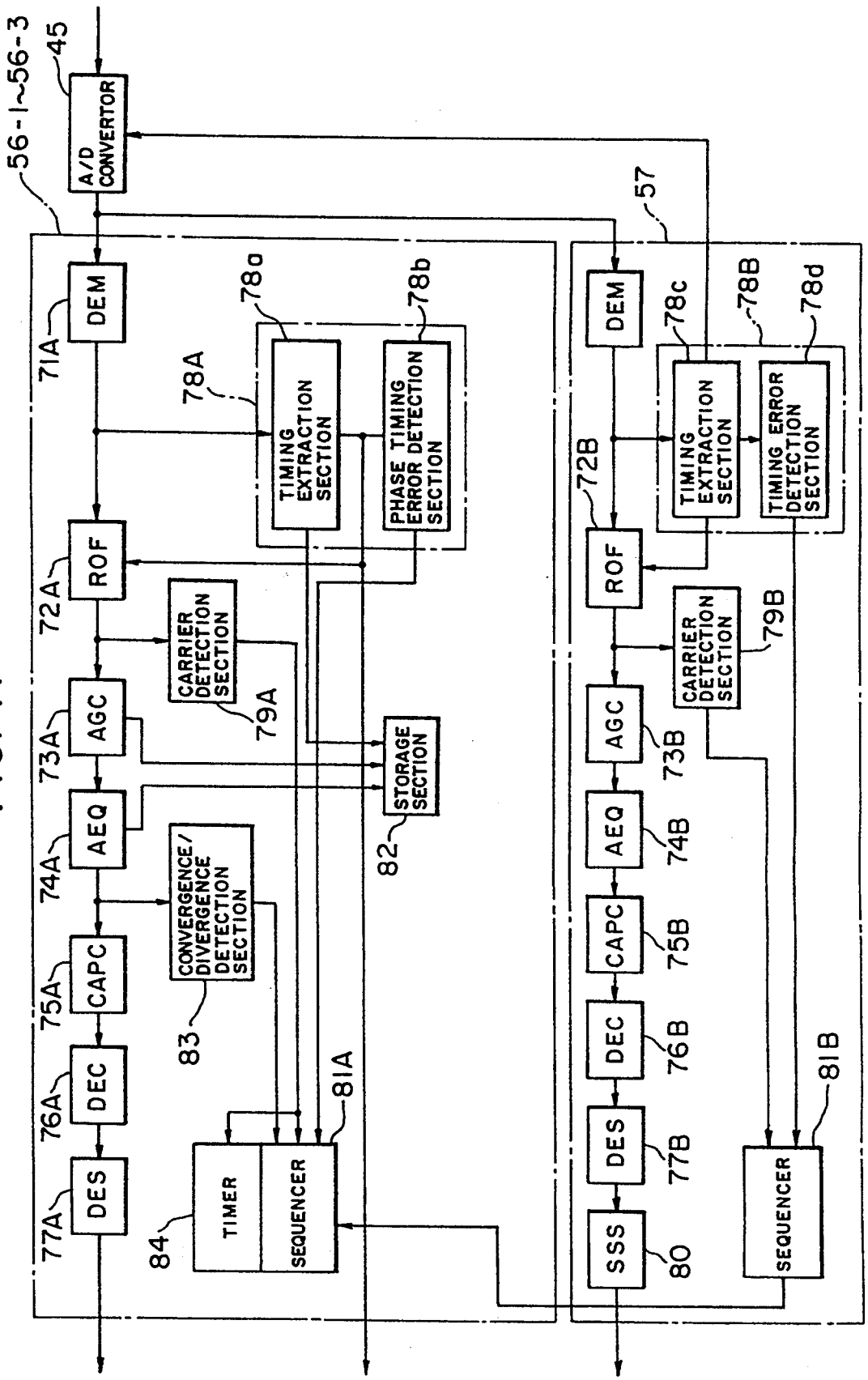
FIG. 11 is a block diagram of a main data demodulation section and a secondary data demodulation section of a still further modem showing a fourth preferred embodiment of the present invention.

Referring now to FIG. 11, there is shown a construction of essential part of a main data demodulation section and a secondary data demodulation section of a modulation and demodulation system according to a fourth preferred embodiment of the present invention. The modulation and demodulation system of the present embodiment is a modification to the modulation and demodulation system of the second embodiment described hereinabove, and only differences between them are described below. In particular, while the main data demodulation sections 56-1 to 56-3 in the present embodiment are constructed in a similar manner to those of the second embodiment shown in FIG. 8, the timing reproduction section 78B of the secondary data demodulation section 57 in the fourth embodiment includes a timing extraction section 78c which extracts timing information from a demodulation signal of secondary data (secondary channel), and a timing error detection section 78d which detects a variation error of timing information extracted by the timing extraction means 78c, that is, a timing variation which arises from an unstable condition of the timing PLL of the timing extraction section 78c, which is described hereinabove in connection with the third embodiment.

Figure 12:
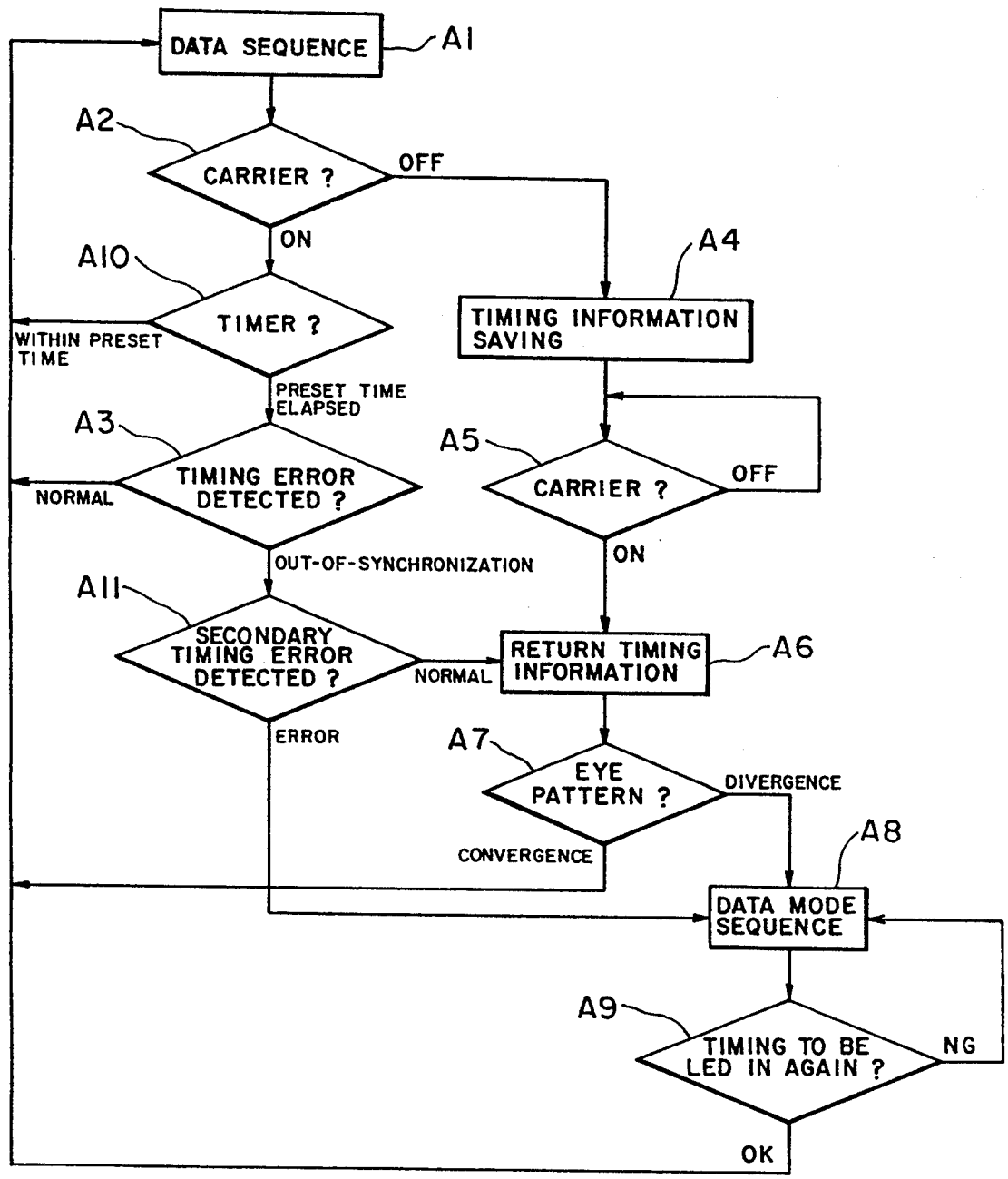
FIG. 12 is a flow chart illustrating operation of the modem of the fourth embodiment.

Due to the construction described above, in the fourth embodiment, when a timing error occurs, the modulation and demodulation system itself can restore demodulation processing based on a normal timing by way of such a procedure as illustrated in FIG. 12. It is to be noted that, in FIG. 12, like steps at which like processing is performed are denoted by like reference step numbers to those of FIGS. 7, 9 and 10.

In particular, referring to FIG. 12, when a timing error (an out-of-synchronization condition) is detected by the phase timing error detection section 78b at step A3 in the data sequence after the time counted by the timer 84 exceeds the preset time, an error detection operation is performed by the timing error detection section 78d of the timing reproduction section 78B of the secondary demodulation section 57 (step A11).

When the timing error detection section 78d determines that timing information of the secondary data has no variation error arising from an unstable condition of the timing PLL, that is, the timing information is normal, the control sequence advances, similarly as in the first and second embodiments, to step A6, at which timing information stored in the storage section 82 is returned to perform demodulation processing of main data. On the contrary when the timing error detection section 78d detects such a variation error as described above, similarly as in the third embodiment, the corresponding one of the main data demodulation sections 56-1 to 56-3 immediately enters, by the sequencer 81A thereof, the data mode sequence (step A8), in which re-leading-in of timing information is performed, without returning timing information from the storage section 82 at step A6. It is to be noted that the processing operations in the present embodiment are quite similar to those described hereinabove in connection with the first and second embodiments except the processing operation at step A11 described above, and accordingly, overlapping description of them is omitted herein to avoid redundancy.

In this manner, with the modulation and demodulation system of the fourth embodiment of the present invention, effects or advantages similar to those described hereinabove in connection with the first to third embodiments can be achieved.

Specifically, since, in the fourth embodiment, the timing error detection section 78d detects, at step A11, presence or absence of a variation error of timing information of secondary data arising from an unstable condition of the timing PLL and the data mode sequence (step A8) is entered only when a variation error is detected, when no variation error is detected, demodulation processing of main data is performed using timing information stored in the storage section 82 without performing re-leading-in of timing information by the data mode sequence (step A6), similarly as in the first and second embodiments. Accordingly, the modulation and demodulation system itself can rapidly restore a demodulation processing condition in which normal timing information is used without taking wasteful time for timing re-leading-in processing.

f. Description of the Fifth Embodiment

Figure 13:
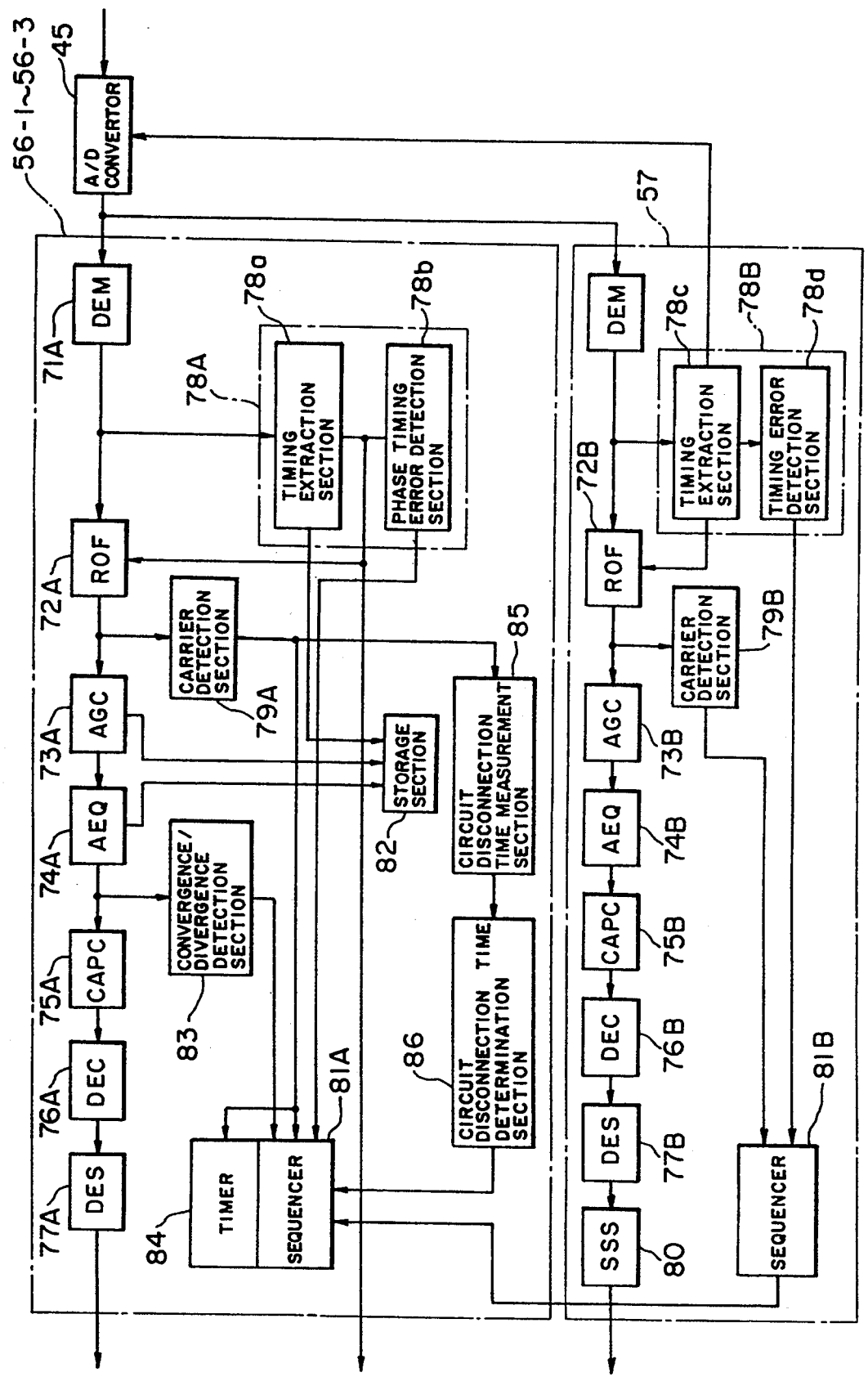
FIG. 13 is a block diagram of a main data demodulation section and a secondary data demodulation section of a yet further modem showing a fifth preferred embodiment of the present invention.

Referring now to FIG. 13, there is shown a construction of essential part of a main data demodulation section and a secondary data demodulation section of a modulation and demodulation system according to a fifth preferred embodiment of the present invention. The modulation and demodulation system of the present embodiment is a modification to the modulation and demodulation system of the fourth embodiment described hereinabove, and only differences between them are described below. In particular, while the secondary data demodulation section 57 in the present embodiment is constructed in a similar manner to that of the fourth embodiment shown in FIG. 11, each of the main data demodulation sections 56-1 to 56-3 additionally includes a circuit disconnection time measurement section 85 and a circuit disconnection time determination section 86.

The circuit disconnection time measurement section 85 measures a circuit disconnection time after the result of detection by the carrier detection section 79A changes from presence of a carrier to absence of a carrier until the result of detection changes back to presence of a carrier, and the circuit disconnection time determination section 86 compares the time measured by the circuit disconnection time measurement section 85 with a preset predetermined time (for example, 5 seconds or so).

Figure 14:
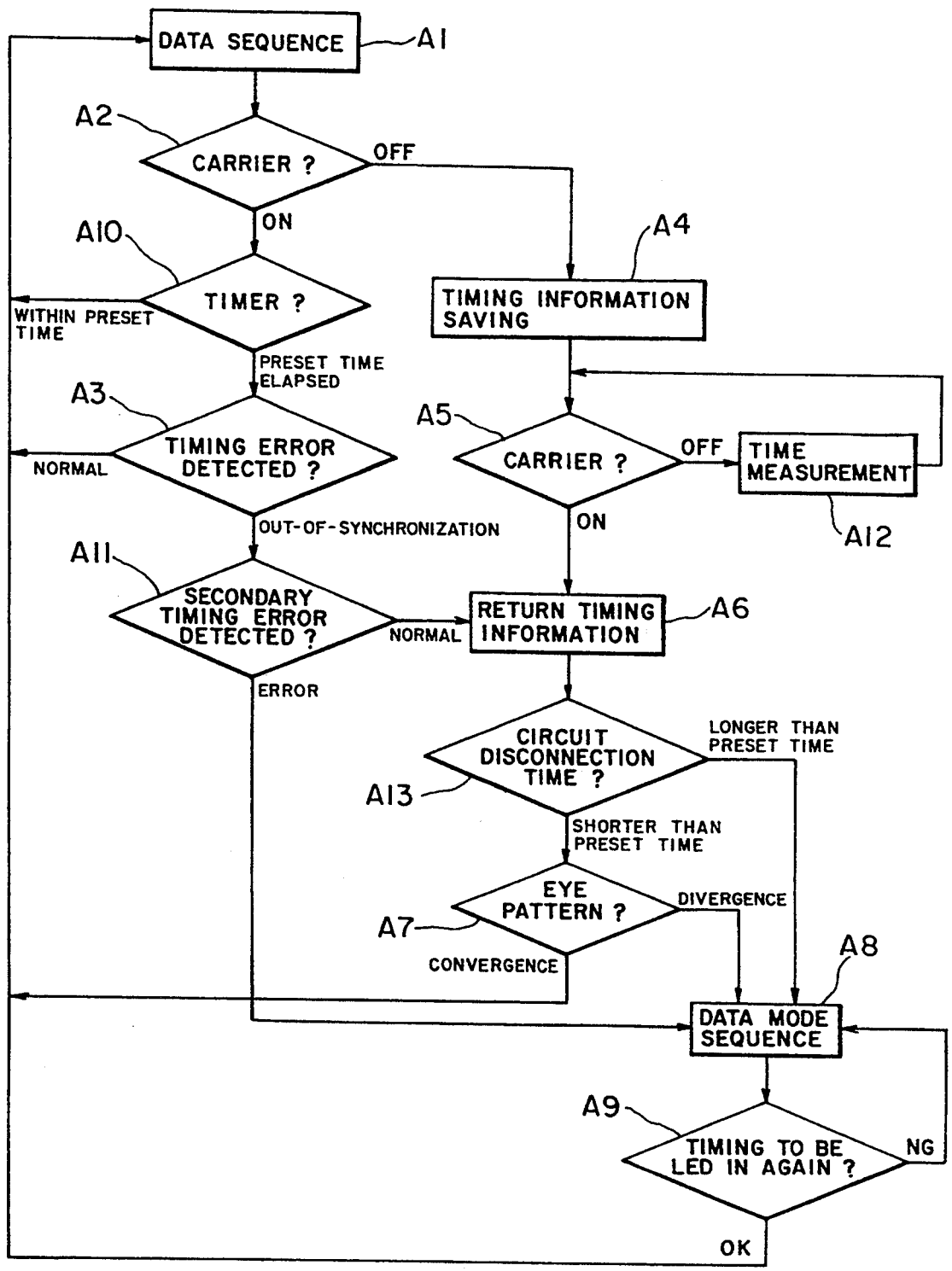
FIG. 14 is a flow chart illustrating operation of the modem of the fifth embodiment.
Figure 15:
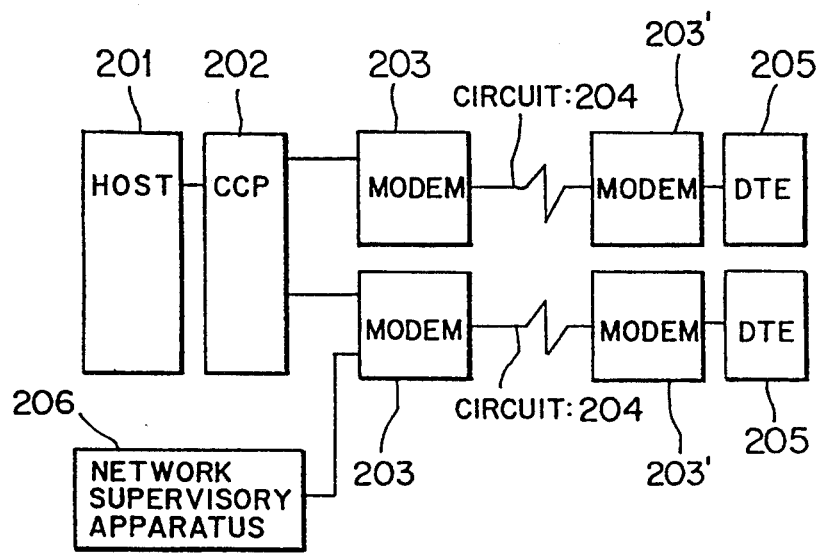
FIG. 15 (PRIOR ART) is a block diagram showing an on-line system.
Figure 16:
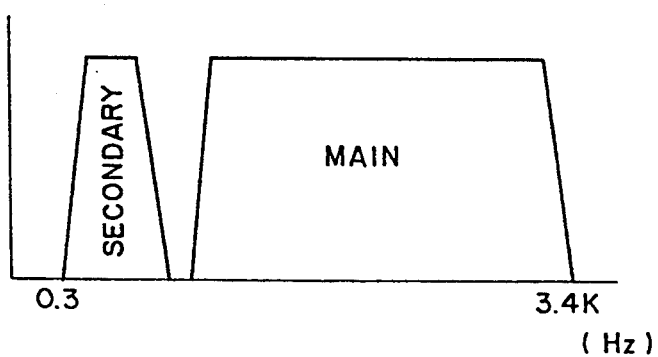
FIG. 16 (PRIOR ART) is a diagram showing frequency bands of a main channel and a secondary channel used in the on-line system shown in FIG. 15.

Due to the construction described above, in the fifth embodiment, when a timing error occurs, the modulation and demodulation system itself can restore demodulation processing based on a normal timing in accordance with such a procedure as illustrated in FIG. 14. It is to be noted that, in FIG. 14, like steps at which like processing to that of FIGS. 7, 9, 10 and 12 is performed are denoted by like reference step numbers.

In particular, referring to FIG. 14, if the carrier detection section 79A in the fifth embodiment detects a carrier and reception of data, the detection signal is supplied as a trigger signal to the sequencer 81A similarly as in the embodiments described above, and consequently, the corresponding one of the main data demodulation sections 56-1 to 56-3 enters, by means of the sequencer 81A thereof, the data sequence as a demodulation processing operation of main data (step A1).

After the data sequence is entered, counting of time by the timer 84 is started, and the main data demodulation section 56-1, 56-2 or 56-3 repetitively detects whether or not a carrier is detected from a demodulation signal by the carrier detection section 79A (step A2). If a carrier is detected by the carrier detection section 79A, then the processing operations at steps A10, A3 and A11 are executed similarly as in the fourth embodiment. However, on the contrary if the carrier detection section 79A does not detect a carrier, that is, detects a no-carrier condition or a circuit disconnection condition, then last timing information extracted from the main channel by the timing extraction section 78a is temporarily saved or stored into the storage section 82 (step A4).

In this instance, the determination at step A5 is repetitively performed by the carrier detection section 79A until a carrier is detected again by the carrier detection section 79A, and in the present embodiment, a circuit disconnection time is measured by the circuit disconnection time measurement section 85 until a carrier is detected again after changing to a no-carrier condition (step A12).

Then, after a carrier is detected again, the main data demodulation section 56-1, 56-2 or 56-3 reads out the last timing information stored in the storage section 82 and resumes demodulation processing of main data using the timing information (step A6). In this instance, in the present embodiment, the circuit disconnection time determination section 86 compares the time measured by the circuit disconnection time measurement section 85 (the circuit disconnection time) with a preset predetermined time (for example, 5 seconds or so) (step A13). If it is determined that the circuit disconnection time is shorter than the predetermined time, a convergence/divergence determination of an eye pattern at step A7 is performed similarly as in the other embodiments.

On the other hand, when the circuit disconnection time is excessively long, normal demodulation processing cannot be performed even if the timing information stored in the storage section 82 is used, resulting in a timing error. Therefore, in the present embodiment, when it is determined at step A13 that the circuit disconnection time is longer than the predetermined time, the control sequence does not advance to step A7, but the result of the determination is sent out to the sequencer 81A. Consequently, the main data demodulation section 56-1, 56-2 or 56-3 directly enters the data mode sequence in which re-leading-in processing of timing information is performed (step A8). Then, the data mode sequence is repeated until re-leading-in of timing information is performed based on the judgment at step A9, and after re-leading-in of timing information is performed, the control sequence returns to the data sequence (step A1).

In this manner, with the modulation and demodulation system of the fifth embodiment of the present invention, effects or advantages similar to those of the first to fourth embodiments described above can be achieved.

Further, when the circuit disconnection time becomes excessively long, even if the timing information stored in the storage section 82 is returned to perform demodulation processing, a timing error is resulted, and in the first to fourth embodiments, the sequence after all advances to the data mode sequence after the processing at steps A7, A2, A10, A3 and A11 is performed. In the present embodiment, such a wasteful processing time can be eliminated by the processing operations at step A12 and A13, and when circuit disconnection occurs, the modulation and demodulation system itself can rapidly restore a demodulation processing condition in which normal timing information is used.

It is to be noted that, while the present invention is applied, in the embodiments described above, to the multiple frequency modem wherein a frequency band of a main channel is divided into three bands, the application of the present invention is not limited to this, and the present invention can be applied similarly to modems which have a single main channel or employ a frequency band divided into a plurality of bands other than three.

The present invention is not limited to the specifically described embodiment, and variations and modifications may be made without departing from the scope of the present invention.

What is claimed is:

1. A modulation and demodulation system wherein a signal is communicated in a main channel for main data and a secondary channel for secondary data obtained by frequency division, comprising:

modulation means for modulating and transmitting main data and secondary data;

demodulation means for receiving and demodulating a receive signal to reproduce main data and secondary data; and analog to digital conversion means for converting the receive signal from an analog signal into a digital signal and for sampling the main data of the main channel and the secondary data of the secondary channel outputted to said demodulation means using a frequency timing extracted from the secondary channel as a sampling timing for said sampling when said demodulation means reproduces said main data and said secondary data;

said demodulation means further including phase timing error detection means for detecting an error of phase timing information extracted from the main channel, and storage means for storing the phase timing information extracted from the main channel to temporarily save the phase timing information, said demodulation means performing, when said phase timing error detection means detects the error of the phase timing information, demodulation processing of the main data using the phase timing information stored in said storage means.

2. The modulation and demodulation system as claimed in claim 1, wherein said demodulation means further includes carrier detection means for detecting a carrier, and when said carrier detection means detects the carrier, said phase timing error detection means performs an error detection operation, but when the result of detection of said carrier detection means changes from presence of a carrier to absence of a carrier, last phase timing information extracted from the main channel is stored into said storage means.

3. The modulation and demodulation system as claimed in claim 2, wherein, when said carrier detection means detects a carrier again after the last phase timing information has been stored into said storage means, said demodulation means performs demodulation processing of the main data using the last phase timing information stored in said storage means.

4. The modulation and demodulation system as claimed in claim 3, wherein said demodulation means further includes circuit disconnection time measurement means for measuring a circuit disconnection time after the result of detection of said carrier detection means changes from presence of a carrier to absence of the carrier until the result of detection changes back to presence of a carrier, and circuit disconnection time determination means for comparing the time measured by said circuit disconnection time measurement means with a preset time, and when said circuit disconnection time determination means determines that the measured time by said circuit disconnection time measurement means is longer than the preset time, said demodulation means performs re-leading-in of timing information.

5. The modulation and demodulation system as claimed in claim 3, wherein said demodulation means further includes convergence/divergence detection means for referring to signal points of the receive signal having a particular eye pattern, which has been generated upon modulation and transmission, to detect and determine convergence/divergence of the eye pattern, and when said demodulation means is to perform demodulation processing of the main data using the phase timing information stored in said storage means, said convergence/divergence detection means detects and determines convergence/divergence of the eye pattern, and then when said convergence/divergence detection means determines that the eye pattern converges, said demodulation means continues demodulation processing of the main data using the phase timing information, but when said convergence/divergence detection means determines that the eye pattern diverges, said demodulation means performs re-leading-in of timing information.

6. The modulation and demodulation system as claimed in claim 3, wherein said demodulation means further includes a timer for counting an elapsed time after said demodulation means starts demodulation processing of the main data, and said phase timing error detection means performs the error detection operation after said timer counts a predetermined time.

7. The modulation and demodulation system as claimed in claim 6, wherein said demodulation means further includes convergence/divergence detection means for referring to signal points of the receive signal having a particular eye pattern, which has been generated upon modulation and transmission, to detect and determine convergence/divergence of the eye pattern. and when said demodulation means is to perform demodulation processing of the main data using the phase timing information stored in said storage means, said convergence/divergence detection means detects and determines convergence/divergence of the eye pattern, and then when said convergence/divergence detection means determines that the eye pattern converges, said demodulation means continues demodulation processing of the main data using the phase timing information, but when said convergence/divergence detection means determines that the eye pattern diverges, said demodulation means performs re-leading-in of timing information.

8. The modulation and demodulation system as claimed in claim 7, wherein said demodulation means further includes circuit disconnection time measurement means for measuring a circuit disconnection time after the result of detection of said carrier detection means changes from presence of the carrier to absence of the carrier until the result of detection changes back to presence of a carrier, and circuit disconnection time determination means for comparing the time measured by said circuit disconnection time measurement means with a preset time, and when said circuit disconnection time determination means determines that the measured time by said circuit disconnection time measurement means is longer than the preset time, said demodulation means performs re-leading-in of timing information.

9. A modulation and demodulation system wherein a signal is communicated in a main channel for main data and a secondary channel for secondary data obtained by frequency division, comprising:

modulation means for modulating and transmitting main data and secondary data;

demodulation means for receiving and demodulating a receive signal to reproduce main data and secondary data; and analog to digital conversion means for converting the receive signal from an analog signal into a digital signal and for sampling the main data of the main channel and the secondary data of the secondary channel outputted to said demodulation means using a frequency timing extracted from the secondary channel as a sampling timing for said sampling when said demodulation means reproduces said main data and said secondary data;

said demodulation means further including phase timing error detection means for detecting an error of phase timing information extracted from the main channel;

said demodulation means performing re-leading-in processing of timing information when said phase timing error detection means detects the error of the phase timing information.

10. The modulation and demodulation system as claimed in claim 9, wherein said demodulation means includes storage means for storing phase timing information extracted from the main channel to temporarily save the phase timing information, and carrier detection means for detecting the carrier, and when said carrier detection means detects the carrier, said phase timing error detection means performs an error detection operation, but when the result of detection of said carrier detection means changes from presence of a carrier to absence of a carrier, last phase timing information extracted from the main channel is stored into said storage means.

11. The modulation and demodulation system as claimed in claim 10, wherein, when said carrier detection means detects a carrier again after the last phase timing information has been stored into said storage means, said demodulation means performs demodulation processing of the main data using the last phase timing information stored in said storage means.

12. The modulation and demodulation system as claimed in claim 11, wherein said demodulation means further includes circuit disconnection time measurement means for measuring a circuit disconnection time after the result of detection of said carrier detection means changes from presence of a carrier to absence of a carrier until the result of detection changes back to presence of the carrier, and circuit disconnection time determination means for comparing the time measured by said circuit disconnection time measurement means with a preset time, and when said circuit disconnection time determination means determines that the measured time by said circuit disconnection time measurement means is longer than the preset time, said demodulation means performs re-leading-in of timing information.

13. The modulation and demodulation system as claimed in claim 11, wherein said demodulation means further includes a timer for counting an elapsed time after said demodulation means starts demodulation processing of the main data, and said phase timing error detection means performs the error detection operation after said timer counts a predetermined time.

14. The modulation and demodulation system as claimed in claim 13, wherein said demodulation means further includes convergence/divergence detection means for referring to signal points of the receive signal having a particular eye pattern, which has been generated upon modulation and transmission, to detect and determine convergence/divergence of the eye pattern, and when said demodulation means is to perform demodulation processing of the main data using the phase timing information stored in said storage means, said convergence/divergence detection means detects and determines convergence/divergence of the eye pattern, and then when said convergence/divergence detection means determines that the eye pattern converges, said demodulation means continues demodulation processing of the main data using the phase timing information, but when said convergence/divergence detection means determines that the eye pattern diverges, said demodulation means performs re-leading-in of timing information.

15. The modulation and demodulation system as claimed in claim 14, wherein said demodulation means further includes circuit disconnection time measurement means for measuring a circuit disconnection time after the result of detection of said carrier detection means changes from presence of the carrier to absence of the carrier until the result of detection changes back to presence of the carrier, and circuit disconnection time determination means for comparing the time measured by said circuit disconnection time measurement means with a preset time, and when said circuit disconnection time determination means determines that the measured time by said circuit disconnection time measurement means is longer than the preset time, said demodulation means performs re-leading-in of timing information.

16. A modulation and demodulation system wherein a signal is communicated in a main channel for main data and a secondary channel for secondary data obtained by frequency division, comprising:
modulation means for modulating and transmitting main data and secondary data;
demodulation means for receiving and demodulating a receive signal to reproduce main data and secondary data; and
analog to digital conversion means for converting the receive signal from an analog signal into a digital signal and for sampling the main data of the main channel and the secondary data of the secondary channel outputted to said demodulation means using a frequency timing extracted from the secondary channel as a sampling timing for said sampling when said demodulation means reproduces said main data and said secondary data;
said demodulation means further including phase timing error detection means for detecting an error of phase timing information extracted from the main channel, storage means for storing the phase timing information extracted from the main channel to temporarily save the phase timing information, and timing error detection means for detecting an error of timing information extracted from the secondary channel, said demodulation means performing, when said phase timing error detection means detects the error of the phase timing information extracted from the main channel and said timing error detection means does not detect the error of the timing information extracted from the secondary channel, demodulation processing of the main data using the phase timing information stored in said storage means whereas said demodulation means performs re-leading-in processing of timing information when said phase timing error detection means detects the error of the phase timing information extracted from the main channel and also said timing error detection means detects the error of the timing information extracted from the secondary channel.

17. The modulation and demodulation system as claimed in claim 16, wherein said demodulation means further includes carrier detection means for detecting a carrier, and when said carrier detection means detects the carrier, said phase timing error detection means performs an error detection operation, but when the result of detection of said carrier detection means changes from presence of a carrier to absence of a carrier, last phase timing information extracted from the main channel is stored into said storage means.

18. The modulation and demodulation system as claimed in claim 17, wherein, when said carrier detection means detects a carrier again after the last phase timing information has been stored into said storage means, said demodulation means performs demodulation processing of the main data using the last phase timing information stored in said storage means.

19. The modulation and demodulation system as claimed in claim 18, wherein said demodulation means further includes circuit disconnection time measurement means for measuring a circuit disconnection time after the result of detection of said carrier detection means changes from presence of the carrier to absence of the carrier until the result of detection changes back to presence of the carrier, and circuit disconnection time determination means for comparing the time measured by said circuit disconnection time measurement means with a preset time, and when said circuit disconnection time determination means determines that the measured time by said circuit disconnection time measurement means is longer than the preset time, said demodulation means performs re-leading-in of timing information.

20. The modulation and demodulation system as claimed in claim 19, wherein said demodulation means further includes a timer for counting an elapsed time after said demodulation means starts demodulation processing of the main data, and said phase timing error detection means performs the error detection operation after said timer counts a predetermined time.

21. The modulation and demodulation system as claimed in claim 20, wherein said demodulation means further includes convergence/divergence detection means for referring to signal points of the receive signal having a particular eye pattern, which has been generated upon modulation and transmission, to detect and determine convergence/divergence of the eye pattern, and when said demodulation means is to perform demodulation processing of the main data using the phase timing information stored in said storage means, said convergence/divergence detection means detects and determines convergence/divergence of the eye pattern, and then when said convergence/divergence detection means determines that the eye pattern converges, said demodulation means continues demodulation processing of the main data using the phase timing information, but when said convergence/divergence detection means determines that the eye pattern diverges, said demodulation means performs re-leading-in of timing information.

22. The modulation and demodulation system as claimed in claim 18, wherein said demodulation means further includes a timer for counting an elapsed time after said demodulation means starts demodulation processing of the main data, and said phase timing error detection means performs the error detection operation after said timer counts a predetermined time.

23. The modulation and demodulation system as claimed in claim 22, wherein said demodulation means further includes convergence/divergence detection means for referring to signal points of the receive signal having a particular eye pattern, which has been generated upon modulation and transmission, to detect and determine convergence/divergence of the eye pattern, and when said demodulation means is to perform demodulation processing of the main data using the phase timing information stored in said storage means, said convergence/divergence detection means detects and determines convergence/divergence of the eye pattern, and then when said convergence/divergence detection means determines that the eye pattern converges, said demodulation means continues demodulation processing of the main data using the phase timing information, but when said convergence/divergence detection means determines that the eye pattern diverges, said demodulation means performs re-leading-in of timing information.

* * * * *

UNITED STATES PATENT AND TRADEMARK OFFICE
CERTIFICATE OF CORRECTION

PATENT NO. : 5,388,122
DATED : February 7, 1995
INVENTOR(S) : Noboru KAWADA et al.

It is certified that error appears in the above-indentified patent and that said Letters Patent is hereby corrected as shown below:

Column 1

Line 60, "Of" should be --of--.

Column 14

Line 3, "Information" should be --information--.

Column 18

Line 47, "(step AS)" should be --(step A8)--;

Line 54, "(step AS)" should be --(step A8)--.

Column 21

Line 53, "(step AS)" should be --(step A8)--.

UNITED STATES PATENT AND TRADEMARK OFFICE
CERTIFICATE OF CORRECTION

PATENT NO. : 5,388,122
DATED : February 7, 1995
INVENTOR(S) : Noboru Kawada, et al.

It is certified that error appears in the above-indentified patent and that said Letters Patent is hereby corrected as shown below:

Column 22

Line 43, "an" should be --the--.

Column 23

Line 8, "a" should be --the--;

Line 51 "pattern." should be --pattern,--.

Signed and Sealed this

Fourth Day of April, 1995

Attest:

BRUCE LEHMAN

*Attesting Officer*     *Commissioner of Patents and Trademarks*